US011582760B2

(12) United States Patent
Khoshnevisan et al.

(10) Patent No.: US 11,582,760 B2
(45) Date of Patent: Feb. 14, 2023

(54) TECHNIQUES FOR JOINT DYNAMIC HYBRID AUTOMATIC REPEAT REQUEST FOR MULTIPLE TRANSMISSION RECEPTION POINTS

(71) Applicant: QUALCOMM Incorporated, San Diego, CA (US)

(72) Inventors: Mostafa Khoshnevisan, San Diego, CA (US); Tao Luo, San Diego, CA (US); Xiaoxia Zhang, San Diego, CA (US); Jing Sun, San Diego, CA (US); Arumugam Chendamarai Kannan, San Diego, CA (US); Yi Huang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 71 days.

(21) Appl. No.: 17/017,110

(22) Filed: Sep. 10, 2020

(65) Prior Publication Data

US 2021/0092744 A1     Mar. 25, 2021

Related U.S. Application Data

(60) Provisional application No. 62/905,687, filed on Sep. 25, 2019.

(51) Int. Cl.
*H04W 72/04*     (2009.01)
*H04W 72/12*     (2009.01)
(Continued)

(52) U.S. Cl.
CPC ....... *H04W 72/0493* (2013.01); *H04W 24/08* (2013.01); *H04W 72/042* (2013.01);
(Continued)

(58) Field of Classification Search
CPC .......... H04W 72/0493; H04W 72/042; H04W 72/0453; H04W 72/1289; H04W 24/08; H04L 5/001
(Continued)

(56) References Cited

U.S. PATENT DOCUMENTS

2019/0103943 A1\*  4/2019  Wang ................... H04L 1/1854
2021/0105750 A1\*  4/2021  Khoshnevisan ...... H04L 5/0055
(Continued)

FOREIGN PATENT DOCUMENTS

WO    WO-2019050323 A1    3/2019
WO    WO-2019099670 A1    5/2019

OTHER PUBLICATIONS

International Search Report and Written Opinion—PCT/US2020/050420—ISA/EPO—dated Dec. 16, 2020.

*Primary Examiner* — Peter G Solinsky
(74) *Attorney, Agent, or Firm* — Holland & Hart LLP

(57) ABSTRACT

Techniques and device for wireless communications are described. A wireless device may establish multiple connections with multiple transmission reception points (TRPs). The wireless device may receive downlink control information (DCI) messages from the multiple transmission points and may generate joint hybrid automatic repeat request feedback (HARQ) based on the received downlink control information messages. To support joint HARQ feedback, counter indices may be jointly assigned to the DCI messages generated by the multiple transmission reception points. The method for jointly assigning the DCI messages may be selected based on a level of interference detected in a communications channel. Also, to support joint HARQ feedback, a total counter index in an uplink DCI message (Continued)

may be configured to indicate a total number of DCI message transmitted from a first TRP and a second TRP during a time period.

26 Claims, 16 Drawing Sheets

(51) Int. Cl.
*H04W 24/08* (2009.01)
*H04L 5/00* (2006.01)
*H04W 72/0453* (2023.01)

(52) U.S. Cl.
CPC ... *H04W 72/0453* (2013.01); *H04W 72/1289* (2013.01); *H04L 5/001* (2013.01)

(58) Field of Classification Search
USPC .......................................................... 370/329
See application file for complete search history.

(56) References Cited

U.S. PATENT DOCUMENTS

| | | | |
|---|---|---|---|
| 2022/0022235 A1* | 1/2022 | Khoshnevisan .. | H04W 72/0453 |
| 2022/0039158 A1* | 2/2022 | Awadin ............. | H04W 74/0816 |
| 2022/0060905 A1* | 2/2022 | Niu ................... | H04W 72/0453 |

* cited by examiner

TECHNIQUES FOR JOINT DYNAMIC HYBRID AUTOMATIC REPEAT REQUEST FOR MULTIPLE TRANSMISSION RECEPTION POINTS

CROSS REFERENCE

The present application for patent claims the benefit of U.S. Provisional Patent Application No. 62/905,687 by KHOSHNEVISAN et al., entitled "TECHNIQUES FOR JOINT DYNAMIC HYBRID AUTOMATIC REPEAT REQUEST FOR MULTIPLE TRANSMISSION RECEPTION POINTS," filed Sep. 25, 2019, assigned to the assignee hereof, and which is hereby incorporated by reference in its entirety.

FIELD OF DISCLOSURE

The following, for example, relates to wireless communications and more specifically to techniques for joint dynamic hybrid automatic repeat request for multiple transmission reception points.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some cases, a UE may communicate with the network using multiple transmission reception points (TRPs). Communicating with the network may include reporting hybrid automatic repeat request (HARQ) feedback for transport blocks received from the multiple TRPs.

SUMMARY

The described techniques relate to improved methods, systems, devices, and apparatuses that support reporting joint hybrid automatic repeat request (HARQ) feedback for multiple transmission reception points (TRPs). For example, a wireless device may establish multiple connections with multiple TRPs and may be configured to receive separate downlink control information (DCI) messages from the multiple TRPs and to jointly report hybrid automatic repeat request (HARQ) feedback for data transmissions indicated by the DCI messages. To support the joint reporting of HARQ feedback, counter downlink assignment indices (cDAIs) may be jointly assigned to DCI messages transmitted from the multiple TRPs. In some cases, the method for jointly assigning the cDAIs is based on a detected level of interference in a communications channel between the wireless device and the TRPs.

Additionally, or alternatively, to support the joint reporting of HARQ feedback, total downlink assignment index (tDAI) fields in an uplink DCI message may be configured to indicate a total number of downlink DCI messages transmitted from the multiple TRPs. For example, a first tDAI field may be configured to indicate a total number of downlink DCI messages transmitted from a first TRP within a time period and a second tDAI field may be configured to indicate a total number of downlink DCI messages transmitted from a second TRP within the time period. In another example, a first tDAI field in an uplink DCI message may be configured to indicate a total number of downlink DCI messages transmitted from a first TRP within a time period and the wireless device may use a value indicated in a tDAI field received in the last downlink DCI message received from the second TRP. In another example, a first tDAI field in an uplink DCI message may be configured to indicate a total number of downlink DCI messages transmitted from a first TRP and a second TRP within a time period.

A method of wireless communications at a base station is described. The method may include configuring a user equipment (UE) with a plurality of component carriers, generating a first set of downlink control information messages in accordance with a first control resource set group for transmission to the UE using at least a first subset of the set of component carriers, generating a second set of downlink control information messages in accordance with a second control resource set group for transmission to the UE using at least a first second of the set of component carriers, where the first set of downlink control information messages and the second set of downlink control information messages are scheduled to be transmitted during a control channel monitoring occasion, and assigning a set of indices to the first set of downlink control information messages and the second set of downlink control information messages based on the generating, where the set of indices is each based at least in part on an associated component carrier and an associated control resource set group and has been jointly assigned to the first set of downlink control information messages and the second set of downlink control information messages.

An apparatus for wireless communications at a base station is described. The apparatus may include a processor, memory coupled with the processor, and instructions stored in the memory. The instructions may be executable by the processor to cause the apparatus to configure a UE with a plurality of component carriers, generate a first set of downlink control information messages in accordance with a first control resource set for transmission to the UE using at least a first subset of the set of component carriers, generate a second set of downlink control information messages in accordance with a second control resource set for transmission to the UE using at least a first second of the set of component carriers, where the first set of downlink control information messages and the second set of downlink control information messages are scheduled to be transmitted during a control channel monitoring occasion, and assign a set of indices to the first set of downlink control information messages and the second set of downlink control information messages based on the generating, where the set of indices is each based at least in part on an associated component carrier and an associated control resource set and has been jointly assigned to the first set of downlink control information messages and the second set of downlink control information messages.

Another apparatus for wireless communications at a base station is described. The apparatus may include means for configuring a user equipment (UE) with a plurality of component carriers, generating a first set of downlink control information messages in accordance with a first control resource set group for transmission to the UE using at least a first subset of the set of component carriers, generating a second set of downlink control information messages in accordance with a second control resource set group for transmission to the UE using at least a first second of the set of component carriers, where the first set of downlink control information messages and the second set of downlink control information messages are scheduled to be transmitted during a control channel monitoring occasion, and assigning a set of indices to the first set of downlink control information messages and the second set of downlink control information messages based on the generating, where the set of indices is each based at least in part on an associated component carrier and an associated control resource set group and has been jointly assigned to the first set of downlink control information messages and the second set of downlink control information messages.

A non-transitory computer-readable medium storing code for wireless communications at a base station is described. The code may include instructions executable by a processor to configure a UE with a plurality of component carriers, generate a first set of downlink control information messages in accordance with a first control resource set group for transmission to the UE using at least a first subset of the set of component carriers, generate a second set of downlink control information messages in accordance with a second control resource set group for transmission to the UE using at least a first second of the set of component carriers, where the first set of downlink control information messages and the second set of downlink control information messages are scheduled to be transmitted during a control channel monitoring occasion, and assign a set of indices to the first set of downlink control information messages and the second set of downlink control information messages based on the generating, where the set of indices is each based at least in part on an associated component carrier and an associated control resource set group and has been jointly assigned to the first set of downlink control information messages and the second set of downlink control information messages.

Some examples of the method, apparatuses, and non-transitory computer-readable medium described herein may further include operations, features, means, or instructions for transmitting the first set of downlink control information messages and the second set of downlink control information messages during the control channel monitoring occasion.

In some examples of the method, apparatuses, and non-transitory computer-readable medium described herein, the assigning may include operations, features, means, or instructions for sequentially assigning a first set of the set of indices to first downlink control information messages of the first set of downlink control information messages and the second set of downlink control information messages that may be within a first component carrier, and sequentially assigning a second set of the set of indices to second downlink control information messages of the first set of downlink control information messages and the second set of downlink control information messages that may be within a second component carrier after sequentially assigning the first set of the set of indices, where a last index of the first set may be in sequence with a first index of the second set.

In some examples of the method, apparatuses, and non-transitory computer-readable medium described herein, the assigning may include operations, features, means, or instructions for assigning a first index of the set of indices to a first downlink control information message of the first set of downlink control information messages that may be scheduled to be transmitted using the first component carrier, assigning a second index of the set of indices to a first downlink control information message of the second set of downlink control information messages that may be scheduled to be transmitted using the first component carrier, assigning a third index of the set of indices to a second downlink control information message of the first set of downlink control information messages that may be scheduled to be transmitted using the second component carrier, and assigning a fourth index of the set of indices to a second downlink control information message of the second set of downlink control information messages that may be scheduled to be transmitted using the second component carrier.

In some examples of the method, apparatuses, and non-transitory computer-readable medium described herein, the assigning may include operations, features, means, or instructions for sequentially assigning a first set of the set of indices to the first set of downlink control information messages, and sequentially assigning a second set of the set of indices to the second set of downlink control information messages, where a last index of the first set may be in sequence with a first index of the second set.

In some examples of the method, apparatuses, and non-transitory computer-readable medium described herein, the assigning may include operations, features, means, or instructions for assigning a first index of the set of indices to a first downlink control information message of the first set of downlink control information messages that may be scheduled to be transmitted using a first component carrier of the set of component carriers, assigning a second index of the set of indices to a second downlink control information message of the first set of downlink control information messages that may be scheduled to be transmitted using a second component carrier of the set of component carriers, assigning a third index of the set of indices to a first downlink control information message of the second set of downlink control information messages that may be scheduled to be transmitted using the first component carrier, and assigning a fourth index of the set of indices to a second downlink control information message of the second set of downlink control information messages that may be scheduled to be transmitted using the second component carrier.

Some examples of the method, apparatuses, and non-transitory computer-readable medium described herein may further include operations, features, means, or instructions for selecting a mode from a set of modes for assigning the set of indices to the first set of downlink control information messages and the second set of downlink control information messages.

Some examples of the method, apparatuses, and non-transitory computer-readable medium described herein may further include operations, features, means, or instructions for transmitting, to the UE, a radio resource control message including a configuration used to configure the UE to use the mode of the plurality of modes based on the selecting.

Some examples of the method, apparatuses, and non-transitory computer-readable medium described herein may further include operations, features, means, or instructions for detecting a first level of interference in a transmission path between the first transmission point and the UE, where the mode of the set of modes that initially assigns the set of indices across the set of transmission points for a given component carrier may be selected based on the detecting.

Some examples of the method, apparatuses, and non-transitory computer-readable medium described herein may further include operations, features, means, or instructions for detecting a first level of interference in a first component carrier and a second component carrier of the set of component carriers, where the mode of the set of modes that initially assigns the set of indices across the set of component carriers for a given transmission point may be selected based on the detecting.

Some examples of the method, apparatuses, and non-transitory computer-readable medium described herein may further include operations, features, means, or instructions for configuring the UE to receive control information over a set of control resource set groups, assigning a first index to a first subset of the set of control resource set groups and a second index to a second subset of the set of control resource set groups, and transmitting the first set of downlink control information messages over the first subset of the set of control resource set groups and the second set of downlink control information messages over the second subset of the set of control resource set groups.

In some examples of the method, apparatuses, and non-transitory computer-readable medium described herein, the first transmission point may be associated with the first index and the first subset of the set of control resource sets and the second transmission point may be associated with the second index and the second subset of the set of control resource sets.

Some examples of the method, apparatuses, and non-transitory computer-readable medium described herein may further include operations, features, means, or instructions for generating a third set of downlink control information messages in accordance with a third control resource set group for transmission to the UE using at least a third subset of the set of component carriers from the first transmission point, generating a fourth set of downlink control information messages in accordance with a fourth control resource set group for transmission to the UE using a least a fourth subset of the set of component carriers from the second transmission point, where the first set of downlink control information messages and the second set of downlink control information messages may be scheduled to be transmitted during a second control channel monitoring occasion, assigning the set of indices to the third set of downlink control information messages and the fourth set of downlink control information messages, where the set of indices may be jointly assigned to the first, second, third, and fourth set of downlink control information messages, and transmitting the third set of downlink control information messages and the fourth set of downlink control information messages during the second control channel monitoring occasion.

Some examples of the method, apparatuses, and non-transitory computer-readable medium described herein may further include operations, features, means, or instructions for computing a summation of a first total number of the first set of downlink control information messages and a second total number of the second set of downlink control information messages, and programming, in each of the first set of downlink control information messages and the second set of downlink control information messages, a field that indicates the summation based on the computing, where the field includes two bits.

Some examples of the method, apparatuses, and non-transitory computer-readable medium described herein may further include operations, features, means, or instructions for programming, in each of the first set of downlink control information messages and the second set of downlink control information messages, a field that indicates an order of a downlink control information message based on the assigning, where the field includes two bits.

Some examples of the method, apparatuses, and non-transitory computer-readable medium described herein may further include operations, features, means, or instructions for transmitting, to the UE, a first radio resource control message including a first configuration used to configure the UE to establish connections with the set of transmission points; a second radio resource control message including a second configuration used to configure the UE to receive the first set of downlink control information messages from the first transmission point and the second set of downlink control information messages from the second transmission point; and a third radio resource control message including a third configuration used to configure the UE to generate a joint dynamic hybrid automatic feedback message for the first set of downlink control information messages and the second set of downlink control information messages.

A method of wireless communications at a UE is described. The method may include establishing a set of connections utilizing a plurality of component carriers, monitoring a first set of downlink control information messages in accordance with a first control resource set group received using at least a first subset of the set of component carriers from a first transmission point of the set of transmission points, monitoring a second set of downlink control information messages in accordance with a second control resource set group received using at least a second subset of the set of component carriers, where the first set of downlink control information messages and the second set of downlink control information messages are received in a control channel monitoring occasion, and determining a set of indices associated with the first set of downlink control information messages and the second set of downlink control information messages based on the monitoring, where the set of indices is each based at least in part on an associated component carrier and an associated control resource set group and has been jointly assigned to the first set of downlink control information messages and the second set of downlink control information messages.

An apparatus for wireless communications at a UE is described. The apparatus may include a processor, memory coupled with the processor, and instructions stored in the memory. The instructions may be executable by the processor to cause the apparatus to establish a set of connections utilizing a plurality of component carriers, monitor a first set of downlink control information messages in accordance with a first control resource set group received using at least a first subset of the set of component carriers, monitor a second set of downlink control information messages in accordance with a second control resource set received using at least a second subset of the set of component carriers from a second transmission point of the set of transmission points, where the first set of downlink control information messages and the second set of downlink control information messages are received in a control channel monitoring occasion, and determine a set of indices associated with the first set of downlink control information messages and the second set of downlink control information messages based on the monitoring, where the set of indices is each based at least in part on an associated component carrier and an associated control resource set and has been jointly assigned to the first set of downlink control information messages and the second set of downlink control information messages.

Another apparatus for wireless communications at a UE is described. The apparatus may include means for establishing a set of connections utilizing a plurality of component carriers, monitoring a first set of downlink control information messages in accordance with a first control resource set group received using at least a first subset of the set of component carriers from a first transmission point of the set of transmission points, monitoring a second set of downlink control information messages in accordance with a second control resource set group received using at least a second subset of the set of component carriers from a second transmission point of the set of transmission points, where the first set of downlink control information messages and the second set of downlink control information messages are received in a control channel monitoring occasion, and determining a set of indices associated with the first set of downlink control information messages and the second set of downlink control information messages based on the monitoring, where the set of indices is each based at least in part on an associated component carrier and an associated control resource set and has been jointly assigned to the first set of downlink control information messages and the second set of downlink control information messages.

A non-transitory computer-readable medium storing code for wireless communications at a UE is described. The code may include instructions executable by a processor to establish a set of connections utilizing a plurality of component carriers, monitor a first set of downlink control information messages in accordance with a first control resource set group received using at least a first subset of the set of component carriers, monitor a second set of downlink control information messages in accordance with a second control resource set received using at least a second subset of the set of component carriers from a second transmission point of the set of transmission points, where the first set of downlink control information messages and the second set of downlink control information messages are received in a control channel monitoring occasion, and determine a set of indices associated with the first set of downlink control information messages and the second set of downlink control information messages based on the monitoring, where the set of indices is each based at least in part on an associated component carrier and an associated control resource set and has been jointly assigned to the first set of downlink control information messages and the second set of downlink control information messages.

Some examples of the method, apparatuses, and non-transitory computer-readable medium described herein may further include operations, features, means, or instructions for determining that a downlink control information message of the first set of downlink control information messages or the second set of downlink control information messages was missed based on determining the set of indices.

Some examples of the method, apparatuses, and non-transitory computer-readable medium described herein may further include operations, features, means, or instructions for receiving an indication that the set of indices was jointly assigned to the first set of downlink control information messages and the second set of downlink control information messages in accordance with either a first mode that initially assigns the set of indices across the set of transmission points for a given component carrier or a second mode that initially assigns the set of indices across the set of component carriers for a given transmission point.

In some examples of the method, apparatuses, and non-transitory computer-readable medium described herein, receiving the indication may include operations, features, means, or instructions for receiving a radio resource control message including a configuration used to configure the UE to use one of the first mode or the second mode.

Some examples of the method, apparatuses, and non-transitory computer-readable medium described herein may further include operations, features, means, or instructions for arranging the first set of downlink control information messages and the second set of downlink control information messages in a sequential order based on whether the first mode or the second mode was indicated, and constructing a hybrid automatic repeat request feedback message based on the arranging.

Some examples of the method, apparatuses, and non-transitory computer-readable medium described herein may further include operations, features, means, or instructions for determining that the four consecutive downlink control information messages were missed based on receiving a second indication that the first mode was used to transmit the first set of downlink control information messages and the second set of downlink control information messages.

Some examples of the method, apparatuses, and non-transitory computer-readable medium described herein may further include operations, features, means, or instructions for determining that four consecutive downlink control information messages were missed based on receiving a second indication that the second mode was used to transmit the first set of downlink control information messages and the second set of downlink control information messages.

Some examples of the method, apparatuses, and non-transitory computer-readable medium described herein may further include operations, features, means, or instructions for receiving a first radio resource control message including a first configuration used to configure the UE to establish connections with the set of transmission points; a second radio resource control message including a second configuration used to configure the UE to receive the first set of downlink control information messages from the first transmission point and the second set of downlink control information messages from the second transmission point; and a third radio resource control message including a third configuration used to configure the UE to generate a joint dynamic hybrid automatic feedback message for the first set of downlink control information messages and the second set of downlink control information messages.

A method of wireless communications at a base station is described. The method may include establishing a set of connections between a UE and a set of transmission points using a set of component carriers, generating a scheduling grant that schedules data resources for an uplink transmission by the UE and requests that the UE transmit a hybrid automatic repeat request feedback message within the data resources, and programming, in the scheduling grant, at least one field that indicates a size of the hybrid automatic repeat request feedback message based on one or both of a first total number of a first set of downlink control information messages that schedule downlink transmissions transmitted by a first transmission point of the set of transmission points using at least a first subset of the set of component carriers during a time period that occurs before the data resources for the uplink transmission are scheduled and a second total number of a second set of downlink control information messages that schedule downlink transmissions transmitted by a second transmission point of the set of transmission points using at least a second subset of the set of component carriers during the time period.

An apparatus for wireless communications at a base station is described. The apparatus may include a processor, memory coupled with the processor, and instructions stored in the memory. The instructions may be executable by the processor to cause the apparatus to establish a set of connections between a UE and a set of transmission points using a set of component carriers, generate a scheduling grant that schedules data resources for an uplink transmission by the UE and requests that the UE transmit a hybrid automatic repeat request feedback message within the data resources, and program, in the scheduling grant, at least one field that indicates a size of the hybrid automatic repeat request feedback message based on one or both of a first total number of a first set of downlink control information messages that schedule downlink transmissions transmitted by a first transmission point of the set of transmission points using at least a first subset of the set of component carriers during a time period that occurs before the data resources for the uplink transmission are scheduled and a second total number of a second set of downlink control information messages that schedule downlink transmissions transmitted by a second transmission point of the set of transmission points using at least a second subset of the set of component carriers during the time period.

Another apparatus for wireless communications at a base station is described. The apparatus may include means for establishing a set of connections between a UE and a set of transmission points using a set of component carriers, generating a scheduling grant that schedules data resources for an uplink transmission by the UE and requests that the UE transmit a hybrid automatic repeat request feedback message within the data resources, and programming, in the scheduling grant, at least one field that indicates a size of the hybrid automatic repeat request feedback message based on one or both of a first total number of a first set of downlink control information messages that schedule downlink transmissions transmitted by a first transmission point of the set of transmission points using at least a first subset of the set of component carriers during a time period that occurs before the data resources for the uplink transmission are scheduled and a second total number of a second set of downlink control information messages that schedule downlink transmissions transmitted by a second transmission point of the set of transmission points using at least a second subset of the set of component carriers during the time period.

A non-transitory computer-readable medium storing code for wireless communications at a base station is described. The code may include instructions executable by a processor to establish a set of connections between a UE and a set of transmission points using a set of component carriers, generate a scheduling grant that schedules data resources for an uplink transmission by the UE and requests that the UE transmit a hybrid automatic repeat request feedback message within the data resources, and program, in the scheduling grant, at least one field that indicates a size of the hybrid automatic repeat request feedback message based on one or both of a first total number of a first set of downlink control information messages that schedule downlink transmissions transmitted by a first transmission point of the set of transmission points using at least a first subset of component carriers during a time period that occurs before the data resources for the uplink transmission are scheduled and a second total number of a second set of downlink control information messages that schedule downlink transmissions transmitted by a second transmission point of the set of transmission points using at least a second subset of the set of component carriers during the time period.

Some examples of the method, apparatuses, and non-transitory computer-readable medium described herein may further include operations, features, means, or instructions for computing the first total number of the first set of downlink control information messages or the second total number of the second set of downlink control information messages, or both, and transmitting the first set of downlink control information messages, the second set of downlink control information messages, and the scheduling grant.

Some examples of the method, apparatuses, and non-transitory computer-readable medium described herein may further include operations, features, means, or instructions for programming, in the scheduling grant, a second field of the at least one field based on the second total number of the second set of downlink control information messages.

Some examples of the method, apparatuses, and non-transitory computer-readable medium described herein may further include operations, features, means, or instructions for configuring the UE to report hybrid automatic repeat request feedback for transport blocks and code block groups, programming, in the scheduling grant, a third field of the at least one field based on a third total number of a third set of downlink control information messages that schedule downlink transmissions transmitted by the first transmission point using at least a third subset of the set of component carriers, the third set of downlink control information messages being associated with code block group based hybrid automatic repeat request feedback, and programming, in the scheduling grant, a fourth field of the at least one field based on a fourth total number of a fourth set of downlink control information messages that schedule downlink transmissions transmitted by the second transmission point using at least a fourth subset of the set of component carriers, the fourth set of downlink control information messages being associated with code block group based hybrid automatic repeat request feedback.

Some examples of the method, apparatuses, and non-transitory computer-readable medium described herein may further include operations, features, means, or instructions for computing the third total number of the third set of downlink control information messages and the fourth total number of the fourth set of downlink control information messages.

In some examples of the method, apparatuses, and non-transitory computer-readable medium described herein, a first field of the at least one field may be programmed solely based on either the first total number of the first set of downlink control information messages or the second total number of the second set of downlink control information messages.

Some examples of the method, apparatuses, and non-transitory computer-readable medium described herein may further include operations, features, means, or instructions for determining that hybrid automatic repeat request feedback may be not requested by any of the second set of downlink control information messages, where a first field of the at least one field may be programmed solely based on the first total number of the first set of downlink control information messages based on the determining.

In some examples of the method, apparatuses, and non-transitory computer-readable medium described herein, a first field of the at least one field may be programmed based on a summation of the first total number and the second total number.

Some examples of the method, apparatuses, and non-transitory computer-readable medium described herein may further include operations, features, means, or instructions for determining that code block group based hybrid automatic repeat request feedback may be not configured for the UE, and selecting a format for transmitting the scheduling grant that includes a first field of the at least one field indicating the first total number of the first set of downlink control information messages and a second field of the at least one field indicating the second total number of the second set of downlink control information messages based on the determining.

Some examples of the method, apparatuses, and non-transitory computer-readable medium described herein may further include operations, features, means, or instructions for assigning a set of indices to the first set of downlink control information messages and the second set of downlink control information messages, where the set of indices may be separately assigned to the first set of downlink control information messages and the second set of downlink control information messages.

Some examples of the method, apparatuses, and non-transitory computer-readable medium described herein may further include operations, features, means, or instructions for transmitting, to the UE, a first radio resource control message including a first configuration used to configure the UE to establish connections with the set of transmission points; a second radio resource control message including a second configuration used to configure the UE to receive the first set of downlink control information messages from the first transmission point and the second set of downlink control information messages from the second transmission point; and a third radio resource control message including a third configuration used to configure the UE to generate a joint dynamic hybrid automatic feedback message for the first set of downlink control information messages and the second set of downlink control information messages.

A method of wireless communications at a UE is described. The method may include establishing a set of connections between the UE and a set of transmission points using a set of component carriers, decoding a scheduling grant that schedules data resources for an uplink transmission by the UE and requests that the UE transmit a hybrid automatic repeat request feedback message within the data resources, and determining a configuration of the hybrid automatic repeat request feedback message based on at least one field in the scheduling grant indicating one or both of a first total number of a first set of downlink control information messages transmitted by a first transmission point of the set of transmission points using at least a first subset of the set of component carriers during a time period that occurs before the data resources for the uplink transmission are scheduled and a second total number of a second set of downlink control information messages transmitted by a second transmission point of the set of transmission points using at least a second subset of the set of component carriers during the time period.

An apparatus for wireless communications at a UE is described. The apparatus may include a processor, memory coupled with the processor, and instructions stored in the memory. The instructions may be executable by the processor to cause the apparatus to establish a set of connections between the UE and a set of transmission points using a set of component carriers, decode a scheduling grant that schedules data resources for an uplink transmission by the UE and requests that the UE transmit a hybrid automatic repeat request feedback message within the data resources, and determine a configuration of the hybrid automatic repeat request feedback message based on at least one field in the scheduling grant indicating one or both of a first total number of a first set of downlink control information messages transmitted by a first transmission point of the set of transmission points using at least a first subset of the set of component carriers during a time period that occurs before the data resources for the uplink transmission are scheduled and a second total number of a second set of downlink control information messages transmitted by a second transmission point of the set of transmission points using at least a second subset of the set of component carriers during the time period.

Another apparatus for wireless communications at a UE is described. The apparatus may include means for establishing a set of connections between the UE and a set of transmission points using a set of component carriers, decoding a scheduling grant that schedules data resources for an uplink transmission by the UE and requests that the UE transmit a hybrid automatic repeat request feedback message within the data resources, and determining a configuration of the hybrid automatic repeat request feedback message based on at least one field in the scheduling grant indicating one or both of a first total number of a first set of downlink control information messages transmitted by a first transmission point of the set of transmission points using at least a first subset of the set of component carriers during a time period that occurs before the data resources for the uplink transmission are scheduled and a second total number of a second set of downlink control information messages transmitted by a second transmission point of the set of transmission points using at least a second subset of the set of component carriers during the time period.

A non-transitory computer-readable medium storing code for wireless communications at a UE is described. The code may include instructions executable by a processor to establish a set of connections between the UE and a set of transmission points using a set of component carriers, decode a scheduling grant that schedules data resources for an uplink transmission by the UE and requests that the UE transmit a hybrid automatic repeat request feedback message within the data resources, and determine a configuration of the hybrid automatic repeat request feedback message based on at least one field in the scheduling grant indicating one or both of a first total number of a first set of downlink control information messages transmitted by a first transmission point of the set of transmission points using at least a first subset of the set of component carriers during a time period that occurs before the data resources for the uplink transmission are scheduled and a second total number of a second set of downlink control information messages transmitted by a second transmission point of the set of transmission points using at least a second subset of the set of component carriers during the time period.

Some examples of the method, apparatuses, and non-transitory computer-readable medium described herein may further include operations, features, means, or instructions for determining, from a first field of the at least one field, the first total number of the first set of downlink control information messages, and determining, from a second field of the at least one field, the second total number of the second set of downlink control information messages, where a size of the hybrid automatic repeat request feedback message may be based on a first summation of the first total number of the first set of downlink control information messages and the second total number of the second set of downlink control information messages.

Some examples of the method, apparatuses, and non-transitory computer-readable medium described herein may further include operations, features, means, or instructions for receiving a configuration to report hybrid automatic repeat request feedback for transport blocks and code block groups, determining, from a third field of the at least one field, a third total number of a third set of downlink control information messages associated with code block group based hybrid automatic repeat request feedback, and determining, from a fourth field of the at least one field, a fourth total number of a fourth set of downlink control information messages associated with code block group based hybrid automatic repeat request feedback, where the size of the hybrid automatic repeat request feedback message may be based on a second summation of the first, second, third, and fourth total numbers.

Some examples of the method, apparatuses, and non-transitory computer-readable medium described herein may further include operations, features, means, or instructions for determining, from a first field of the at least one field, the first total number of the first set of downlink control information messages, and decoding at least a portion of a third set of downlink control information messages received using at least a third subset of the set of component carriers from the second transmission point during the time period, where a last downlink control information message of the third set of downlink control information messages indicates a total number of the third set of downlink control information messages, where a size of the hybrid automatic repeat request feedback message may be determined based on a summation of the first total number of the first set of downlink control information messages and the second total number of the second set of downlink control information messages.

Some examples of the method, apparatuses, and non-transitory computer-readable medium described herein may further include operations, features, means, or instructions for decoding a fourth set of downlink control information messages received using at least a fourth subset of the set of component carriers from the first transmission point during the time period, determining a fourth total number of the fourth set of downlink control information messages based on the decoding, comparing the fourth total number of the fourth set of downlink control information messages with the first total number of the first set of downlink control information messages, and identifying a missed downlink control information message based on the comparing.

Some examples of the method, apparatuses, and non-transitory computer-readable medium described herein may further include operations, features, means, or instructions for determining that hybrid automatic repeat request feedback may be not requested by any of the second set of downlink control information messages, and determining that a first field of the at least one field indicates the first total number of the first set of downlink control information messages based on determining that hybrid automatic repeat request feedback may be not requested by any of the second set of downlink control information messages, where a size of the hybrid automatic repeat request feedback may be determined based on the first total number of the first set of downlink control information messages.

Some examples of the method, apparatuses, and non-transitory computer-readable medium described herein may further include operations, features, means, or instructions for determining, from a first field of the at least one field, a summation of the first total number of the first set of downlink control information messages and the second total number of the second set of downlink control information messages, where a size of the hybrid automatic repeat request feedback message may be determined based on the summation.

Some examples of the method, apparatuses, and non-transitory computer-readable medium described herein may further include operations, features, means, or instructions for determining that code block group based hybrid automatic repeat request feedback may be not configured for the UE, and selecting a format for receiving the scheduling grant that includes a first field of the at least one field indicating the first total number of the first set of downlink control information messages and a second field of the at least one field indicating the second total number of the second set of downlink control information messages based on determining that code block group based hybrid automatic repeat request feedback may be not configured.

Some examples of the method, apparatuses, and non-transitory computer-readable medium described herein may further include operations, features, means, or instructions for receiving a first radio resource control message including a first configuration used to configure the UE to establish connections with the set of transmission points; a second radio resource control message including a second configuration used to configure the UE to receive the first set of downlink control information messages from the first transmission point and the second set of downlink control information messages from the second transmission point; and a third radio resource control message including a third configuration used to configure the UE to generate a joint dynamic hybrid automatic feedback message for the first set of downlink control information messages and the second set of downlink control information messages.

DETAILED DESCRIPTION

Figure 1:
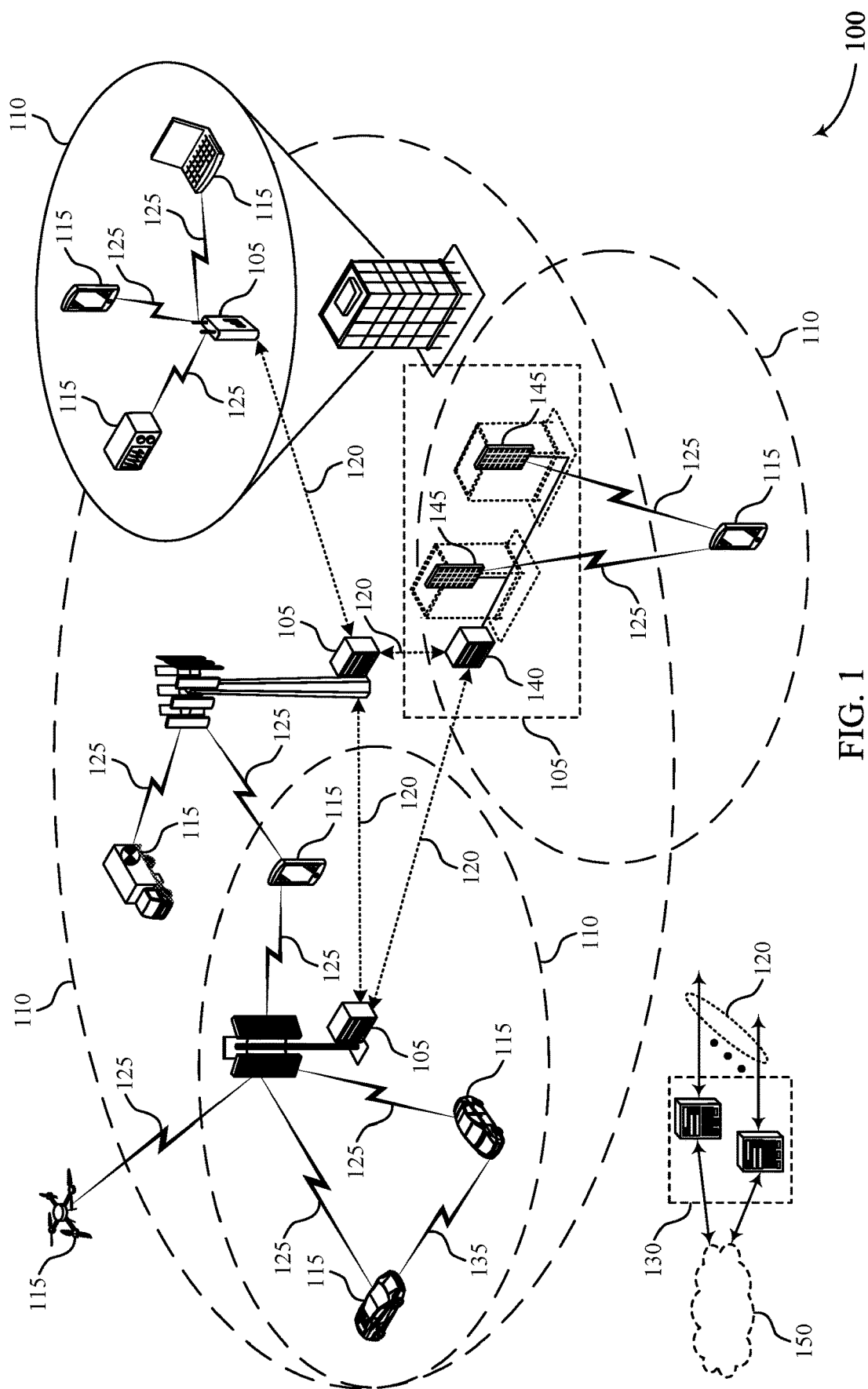
FIG. 1 illustrates an example of a wireless communications system that supports reporting joint hybrid automatic repeat request (HARQ) feedback for multiple transmission reception points (TRPs) in accordance with various aspects of the present disclosure.

A wireless communications system may support transmissions to a single user equipment (UE) from multiple transmission points (TRPs) using multiple component carriers (CCs). In some cases, the TRPs may transmit to the UE using separate physical downlink shared channels (PDSCHs) and may use separate DCI messages to indicate resource assignments on the respective PDSCHs. In some cases, the TRPs may transmit DCI messages for the UE over PDCCH resources during time periods that have been configured for the UE, which may also be referred to as monitoring occasions.

The wireless communications system may also support the reporting of hybrid automatic repeat request (HARQ) feedback for the transmissions between the UE and the TRPs. In some cases, the TRPs may transmit information to the UE in transport blocks, and the UE may be configured to report HARQ feedback for each of the transmitted transport blocks. Additionally, or alternatively, the TRPs may transmit information to the UE in transport blocks that have been partitioned into code block groups, and the UE may be configured to report HARQ feedback for each of the transmitted code block groups.

In some cases, HARQ feedback for the transmission between the UE and the TRPs may be jointly reported. To support HARQ feedback reporting, downlink assignment indices (DAIs) may be assigned to DCI messages transmitted from the TRPs, including counter DAIs (cDAIs) and total DAIs (tDAIs). When multiple DCI messages are transmitted from multiple TRPs and HARQ feedback is jointly reported for the transmissions from the multiple TRPs, cDAIs may be either jointly assigned or separately assigned to the DCI messages. Techniques for assigning cDAIs to DCI messages transmitted from multiple TRPs 145 over multiple component carriers may be determined.

When cDAIs are jointly assigned to the DCI messages, the cDAIs may be assigned in one of multiple ways. In some cases, cDAIs are assigned to the DCI messages (e.g., by programming a cDAI field of a DCI message) first across TRPs, then across CCs, and then across monitoring occasions. In other cases, cDAIs are assigned to the DCI messages first across CCs, then across TRPs, and then across monitoring occasions. In some cases, the method used for assigning DCI messages is based on detected or expected interference between the UE and the TRPs. For example, if a level of interference is detected in a path between a first TRP and a UE, the cDAIs may be assigned to the DCI messages first across TRPs, then across CCs, and then across monitoring occasions. By assigning cDAIs in this way, a UE may be able to detect that four consecutive DCI messages transmitted from the first TRP were missed, for example. In another example, if a level of interference is detected in two consecutive component carriers used by the UE and TRPs, the cDAIs may be assigned to the DCI messages first across CCs, then across TRPs, and then across monitoring occasion. By assigning cDAIs in this way, a UE may be able to detect that four consecutive DCI messages transmitted in two consecutive CCs were missed, for example.

When cDAIs are separately assigned to the DCI messages, the cDAIs may be assigned separately to DCI messages transmitted from a first TRP and to DCI messages transmitted from a second TRP. In some cases, a UE receives an uplink DCI message that directs the UE to transmit a HARQ feedback message over physical uplink shared channel (PUSCH) resources that are scheduled by the uplink DCI message. In some cases, the uplink DCI message includes a tDAI field that is assigned a value based on a size of the HARQ feedback message expected by the network. The UE may use the value received in the tDAI field of the uplink DCI message to determine the size and payload of the HARQ feedback message expected by the network.

To enable the UE to determine an expected size and payload of the HARQ feedback message, the uplink DCI message may use a first tDAI field to indicate a total number of DCI messages (and/or transport blocks) transmitted from a first TRP during a period and a second tDAI field to indicate a total number of DCI message (and/or transport blocks) transmitted from a second TRP during the period. A UE that receives the uplink DCI message may add the values indicated in the first and second tDAI fields to determine an expected size and payload of the HARQ feedback message. In some cases, the first TRP and second TRP may also transmit transport blocks that are partitioned into code block groups. In such cases, the uplink DCI message may use the first tDAI field, the second tDAI field, a third tDAI field that indicates a total number of DCI messages that schedule transport blocks that are partitioned into code block groups (and/or a total number of code block groups) and are transmitted from the first TRP during the period, and a fourth tDAI field that indicates a total number of DCI messages that schedule transport blocks that are partitioned into code block groups (and/or a total number of code block groups) and are transmitted from the first TRP during the period.

In another example, the uplink DCI message may use the first tDAI field to indicate a total number of DCI messages (and/or transport blocks and code block groups) transmitted from a first TRP during a time period, and the UE may use the value indicated in the first tDAI field in addition to a value indicated in a last DCI message received from the second TRP during the time period to determine an expected size and payload of the HARQ feedback message. In some cases, a second field in the uplink DCI message may be used to indicate a total number of DCI messages scheduling transport blocks that are partitioned into code block groups from a first TRP and a time period and the UE the UE may add the value indicated in the second tDAI field to a value indicated in a last DCI message scheduling transport blocks that are partitioned into code block groups and received from the second TRP during the time period to determine an expected size and payload of the HARQ feedback message In another example, the uplink DCI message may use the first tDAI field to indicate a total number of DCI messages/ transport blocks transmitted from a first TRP and a second TRP during a time period. A UE that receives the uplink DCI message may use the value indicated in the first tDAI field to determine an expected size and payload of the HARQ feedback message. In some cases, a second field in the uplink DCI message may be used to indicate a total number of DCI messages scheduling transport blocks that are partitioned into code block groups and transmitted from a first TRP and a second TRP during a time period.

In some cases, the uplink DCI message is configured with two fields that are used differently based on whether code block group-based HARQ reporting is configured. For example, if code-block group-based HARQ reporting is not configured, the first tDAI field may indicate a total number of DCI messages/transport blocks transmitted from a first TRP during a period and the second tDAI field may indicate a total number of DCI message/transport blocks transmitted from a second TRP during the period. Otherwise, if code-block group-based HARQ reporting is configured, the first DAI field may indicate a total number of DCI messages/ transport blocks transmitted from a first TRP during a period and a UE may use the value indicated in the first tDAI field in addition to a value indicated in a last DCI message received from the second TRP during the time period to determine an expected size and payload of the HARQ feedback message. Similarly, the second tDAI field may be used to indicate a total number of DCI messages scheduling transport blocks that are partitioned into code block groups and transmitted from a first TRP during a period and a UE may use the value indicated in the second tDAI field in addition to a value indicated in a last DCI message received from the second TRP indicating the total number of DCI messages scheduling code block groups and transmitted from the second TRP during the time period to determine an expected size and payload of the HARQ feedback message. Alternatively, if code-block group-based HARQ reporting is configured, the first DAI field may indicate a total number of DCI messages/transport blocks transmitted from a first TRP and a second TRP during a period. Similarly, the second tDAI field may indicate a total number of code-block groups transmitted from a first TRP and a second TRP during the period.

Aspects of the disclosure are initially described in the context of a wireless communications system. Specific examples are then described of resource map for reporting joint HARQ feedback for multiple TRPs. Aspects of the disclosure are further illustrated by and described with reference to apparatus diagrams, system diagrams, and flowcharts that relate to reporting joint HARQ feedback for multiple TRPs.

FIG. 1 illustrates an example of a wireless communications system that supports reporting joint HARQ feedback for multiple TRPs in accordance with various aspects of the present disclosure.

The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or another interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a certain bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a certain radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a certain carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may include of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity, which may be an example of an access node controller (ANC). Each access network entity may communicate with the UEs 115 through one or more other access network transmission entities, which may be referred to as radio heads, smart radio heads, or transmission/reception points (TRPs). Each TRP 145 may include one or more antenna panels. In some configurations, various functions of each TRP 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at certain orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a certain orientation (e.g., with respect to the antenna array of the transmitting device or receiving device, or with respect to some other orientation).

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A wireless communications system 100 may support communications between a base station 105 and a UE 115. In some cases, a transmission from a base station 105 to a UE 115 includes a portion of the transmission that is transmitted in a PUCCH and a portion of the transmission that is transmitted in a PUSCH. In some cases, the base station 105 transmits a DCI message over resources in the PUCCH (i.e., PUCCH resources) and data for the UE over resources in the PUSCH (i.e., PUSCH resources), where the DCI message indicates a location of the PUSCH resources. In some cases, the wireless communications system 100 may be configured to periodically switch between the PUCCH and PUSCH in an alternating fashion—e.g., the wireless communications system 100 may allocate frequency resources to the PUCCH during a first time period, the frequency resources to the PUSCH during a second time period adjacent and following the first time period, the frequency resources to the PUCCH during a third time period adjacent and following the second time period, and so on.

In some cases, a UE 115 may be configured to monitor certain resources during an occurrence of the PUCCH for a DCI message carrying information for the UE 115. In some cases, the UE 115 may be configured to monitor certain time and frequency resources for a DCI message during each occurrence of the PUCCH. In other cases, the UE 115 may be configured to monitor certain time and frequency resources for a DCI message in every other occurrence of PUCCH, or in some other monitoring pattern. The time and frequency resources monitored by the UE 115 during an occurrence of the PUCCH may be referred to as monitoring occasions.

A wireless communications system 100 may support error reporting for failed communications between a base station 105 and a UE 115. In some cases, a base station 105 may transmit information to a UE 115 over certain time and frequency resources in a PDSCH, where the time and frequency resources may be indicated to the UE 115 by DCI messages (e.g., downlink assignments) received in a PDCCH. Time and frequency resources indicated by a DCI message may be referred to as a transport block. In some cases, a UE 115 may confirm whether a transport block was successfully or unsuccessfully received by the UE 115— e.g., by transmitting an ACK indicator if the transport block was successfully received and decoded or a NACK indicator if the transport block was not received or unsuccessfully received and/or decoded. In some cases, the certain time and frequency resources in the PDSCH used to transmit information to the UE 115 may be partitioned into code blocks, and the UE 115 may confirm whether a code block group was successfully or unsuccessfully received by the UE 115.

A wireless communications system 100 may also support the retransmission of failed transport blocks and/or code block groups based on reported errors—e.g., when the wireless communications system 100 is configured to support HARQ operation. In some cases, if a transport block and/or code block group was unsuccessfully received, a base station 105 may retransmit the transport block to a UE 115 in a subsequent downlink transmission. In such cases, ACK and NACK indicators transmitted by a UE 115 may be referred to as HARQ feedback. In some cases, the UE 115 may aggregate ACK and NACK indicators for multiple transport blocks and/or code block groups indicated by multiple DCI messages in a single HARQ feedback message that is used to report an ACK/NACK indication for the multiple transport blocks. In some cases, the HARQ feedback message may be transmitted over resources during an occurrence of the PUCCH. In other cases, the HARQ feedback message may be transmitted over resources during an occurrence of the PUSCH—i.e., the HARQ feedback message may be multiplexed with data transmitted in the PUSCH. In some cases, HARQ feedback for transport blocks may be referred to as transport block-based HARQ feedback and HARQ feedback for code block groups may be referred to as code block group-based HARQ feedback.

In some cases, HARQ feedback may be reported semi-statically or dynamically. Semi-static HARQ feedback reporting may include determining the size and payload of a HARQ feedback message prior to transmitting transport blocks to a UE 115—e.g., a HARQ feedback message transmitted over a PUCCH resource may include three A/N indicators (e.g., three bits) based on a base station 105 and a UE 115 agreeing that the base station 105 will transmit three transport blocks to the UE 115 at a time. Dynamic HARQ feedback reporting may include dynamically determining the size and payload of a HARQ feedback transmission based on the number of DCI messages received by a UE 115—e.g., a HARQ feedback message may include four A/N indicators based on a UE 115 receiving four DCI messages before the UE is scheduled to transmit the HAQ feedback message to the base station 105 (for example, before PUCCH resources are scheduled for the UE 115). In some cases, dynamic HARQ feedback reporting may cause a base station 105 to incorrectly decode a HARQ feedback message transmitted by a UE 115. For example, when a UE 115 fails to receive all of the DCI messages transmitted by a base station 105, the UE 115 may report a HARQ feedback message with fewer A/N indicators than the base station 105 expects to receive in the HARQ feedback message.

To support dynamic HARQ feedback reporting, a wireless communications system 100 may use DAIs to harmonize the reporting of HARQ feedback between a base station 105 and a UE 115. For example, a base station 105 may include a cDAI field in a DCI message that indicates a position of the DCI message within a larger group of DCI messages for which HARQ feedback is expected from the base station 105—e.g., a base station 105 that expects to receive a HARQ feedback message with five A/N indicators from a UE 115 may transmit a first DCI message with a cDAI of 1, a next DCI message with a cDAI of 2, and so on until a last DCI message with a cDAI of 5 is transmitted. A UE 115 may decode received DCI messages and determine a respective cDAI associated with the received DCI messages—e.g., a UE 115 may determine that a cDAI of 3 is associated with a received DCI message and may determine that the received DCI message corresponds to a third DCI message. In some cases, if a UE 115 receives an out-of-order DCI message—e.g., if the UE 115 receives a DCI message having a cDAI of 5 after receiving a DCI message having a cDAI of 3 and without receiving a DCI message having a cDAI of 4—the UE 115 may determine that the fourth DCI message was missed. Thus, by using cDAIs, a UE 115 may be able to determine if a DCI message and corresponding transport block transmitted by a base station 105 was missed.

Also, a UE 115 that determines a DCI message was missed may construct a HARQ feedback message to indicate a NACK for the missed DCI message/transport block. After constructing the HARQ feedback message based on cDAIs received in DCI messages, the UE 115 may transmit the HARQ feedback message to the transmitting base station 105—e.g., during a scheduled PUCCH resource. For example, when a UE 115 misses a fourth DCI message, as in the above example, and the base station 105 expects a HARQ feedback message with five A/N indicators—e.g., based on transmitting five DCI messages—the base station 105 may receive a HARQ feedback message including five A/N indicators based on the UE 115 including a NACK indicator for the missed fourth DCI message. If the UE 115 had not determined a DCI message was missed and failed to include the NACK indicator for the missed DCI message in the HARQ feedback message, the UE 115 may have transmitted four A/N indicators, and the base station 105 may have failed to decode the HARQ feedback message—e.g., due to a mismatch between the size of the HARQ feedback message expected by the base station 105 and the actual size of the HARQ feedback message transmitted by the UE 115.

In some cases, even when cDAIs are used, a UE 115 may send a mismatched HARQ feedback message to a base station 105—e.g., if a last, fifth DCI message is missed, the UE 115 may be unaware that the last DCI message was missed because an out-of-order DCI message may not be received, and thus, the UE may transmit a HARQ feedback message with four A/N indicators instead of five A/N indicators.

In some cases, the cDAI is represented using two bits—e.g., a cDAI of one corresponds to 00, a cDAI of two corresponds to 01 . . . a cDAI of five corresponds to 00, a cDAI of six corresponds to 01, and so on. In such cases, before assigning a cDAI value to a DCI message, a base station 105 may apply a modulo operation to a value of a counter used to keep track of the number of transmitted DCI messages—e.g., a base station 105 assigns cDAIs to DCI messages based on the following equation: cDAI=(n mod 4)−1, where n is equal to the total number of DCI messages transmitted by the base station 105 before a PUCCH resource is scheduled. But when two bits are used to represent the cDAI, a UE 115 may be unable to identify the reception of out-of-order DCI messages when four DCI messages are missed in a row—e.g., if a UE 115 receives a first DCI message having a cDAI of 00, misses the next four DCI messages having cDAI values 01 to 00, and receives a sixth DCI message having a cDAI of 01, the UE 115 may be unable to determine that the second through fifth DCI messages were missed. Thus, the UE 115 may construct a HARQ feedback message having two A/N indicators, and the base station 105 may attempt to decode a HARQ feedback message having six A/N indicators.

A wireless communications system 100 may support communications over multiple component carriers—e.g., when the wireless communications system 100 is configured to support CA. In some cases, to support multiple component carriers, a base station 105 may transmit multiple DCI messages during a single monitoring occasion monitored by a UE 115—e.g., a first DCI message transmitted over a first component carrier may be used to indicate PUSCH resources for the UE 115 in the first component carrier and a second DCI message transmitted over a second component carrier may be used to indicate PUSCH resources for the UE 115 in the second component carrier.

In some cases, the wireless communications system 100 supports HARQ operations for transmissions over the multiple component carriers. To support HARQ operations for transmissions over multiple component carriers, a base station 105 may include a tDAI in a DCI message that indicates the total number of DCI messages transmitted by the base station 105. In some cases, a tDAI is included in addition to a cDAI. In some cases, the tDAI indicates the total number of DCI messages that have been transmitted in a same PDCCH monitoring occasion—e.g., if two DCI messages are transmitted in a same monitoring occasion, a first DCI message may have a cDAI of 1 and a tDAI of 2 and a second DCI message may have a cDAI of 2 and a tDAI of 2. By indicating the tDAI, a UE 115 may be able to determine that a DCI message has been missed even when another DCI message is received during a monitoring occasion—e.g., if a fifth and sixth DCI message are transmitted over different component carriers in a same monitoring occasion, the UE 115 may determine the sixth DCI message was missed even if the fifth DCI message is received. In some cases, the tDAI is represented using two bits.

In some cases, the wireless communications system 100 may also use tDAIs in uplink DCI messages (e.g., scheduling grants) that schedule PUSCH resources to indicate a size of a HARQ feedback message scheduled during the PUSCH resources to a UE 115. For example, if HARQ feedback is expected for six transport blocks—e.g., based on transmitting six DCI messages—then a tDAI in an uplink DCI message may be programmed to indicate that six DCI messages were transmitted during some time periods. By including a tDAI field in an uplink DCI message, the wireless communications system 100 may protect an uplink data transmission over the PUSCH resources—e.g., by ensuring that a dynamically generated HARQ feedback message matches an expected size.

A wireless communications system 100 may support transmissions to a single UE from multiple TRPs 145, where the TRPs 145 may be separated from one another by a physical distance—e.g., the TRPs 145 may be separated by feet or meters. In some cases, the multiple TRPs 145 may be controlled by a single base station 105. In some cases, the multiple TRPs 145 may simultaneously perform separate transmissions to a UE 115. Each transmission may include DCI that indicates a location of resources for the UE 115 in a PDSCH of a respective transmission—e.g., first DCI in a first transmission from a first TRP 145 may indicate a location of resources for the UE 115 in a first PDSCH of the first transmission and second DCI in a second transmission from a second TRP 145 may indicate a location of resources for the UE 115 in a second PDSCH of the second transmission.

To support transmissions from multiple TRPs 145 and having multiple DCIs, different CORESET groups may be monitored for transmissions from different TRPs 145. Each CORESET group may be associated with one or more CORESETs, where each CORESET may correspond to a recurring allocation of time and frequency resources. In some cases, the different CORESET groups may be used to differentiate the transmissions of one TRP 145 from the transmission of another TRP 145—e.g., DCI received in CORESETs of a first CORESET group may correspond to a first TRP 145 and DCI received in CORESETs of a second CORESET group may correspond to a second TRP 145. In some examples, the different CORESET groups are assigned an index that indicates the indices of the different CORESET groups, allowing a UE 115 to determine which CORESET group corresponds to a CORESET monitored by the UE 115. The indices of the CORESET groups may be indicated by higher-layer and/or control signaling.

In some cases, a wireless communications system 100 supports the reporting of HARQ feedback for transport blocks received over multiple PDSCHs of multiple transmissions that originate from multiple TRPs 145. In some cases, the HARQ feedback may be jointly reported for each of the PDSCHs and/or TRPs 145—e.g., first HARQ feedback for transport blocks received over a first PDSCH used by a first TRP 145 and second HARQ feedback for transport blocks received over a second PDSCH used by a second TRP 145 may be transmitted in a same HARQ feedback message over a same PUCCH resource.

When transmitting from multiple TRPs 145, the wireless communications system 100 may use cDAIs to alert a UE 115 when a DCI message has been missed. In some cases, a base station 105 may jointly assign cDAIs to the DCI messages transmitted by different TRPs 145—e.g., cDAIs of 1 and 2 may be assigned to a first and second DCI message transmitted by a first TRP 145, a cDAI of 3 may be assigned to a first DCI message transmitted by the second TRP 145 that follows the first and second DCI messages transmitted by the first TRP 145, and so on. That is, the base station 105 may count DCI messages transmitted from different TRPs 145 as if the DCI messages were transmitted by a single base station 105. In other cases, a base station 105 may separately assign cDAIs to the DCI messages transmitted by different TRPs 145—e.g., cDAIs of 1 and 2 may be assigned to a first and second DCI message transmitted by a first TRP 145, a cDAI of 1 may be assigned to a first DCI message transmitted by the second TRP 145 that follows the first and second DCI messages transmitted by the first TRP 145, and so on. That is, the base station 105 may count DCI messages transmitted from different TRPs 145 individually.

In some cases, a wireless communications system 100 supports transmissions to a single UE 115 from multiple TRPs 145 over multiple component carriers, as well as, the reporting of HARQ feedback for the transmitted transport blocks. In some cases, a UE 115 may be unable to detect when four consecutive DCI messages (e.g., DCI messages having a cDAI of 3 to a cDAI of 6) are missed. Techniques for assigning cDAIs to DCI messages transmitted from multiple TRPs 145 over multiple component carriers may be determined.

In some cases, cDAIs may be separately assigned to DCI messages transmitted by multiple TRPs 145 over multiple component carriers. When cDAIs are separately assigned to DCI messages transmitted by multiple TRPs 145, a UE 115 may be unable to determine a total length of a HARQ feedback message expected by the network (e.g., a base station 105 or the TRPs 145) to be transmitted over PUSCH resources. Techniques for indicating and/or determining a length of a HARQ feedback message transmitted over PUSCH resources may be determined.

Figure 2:
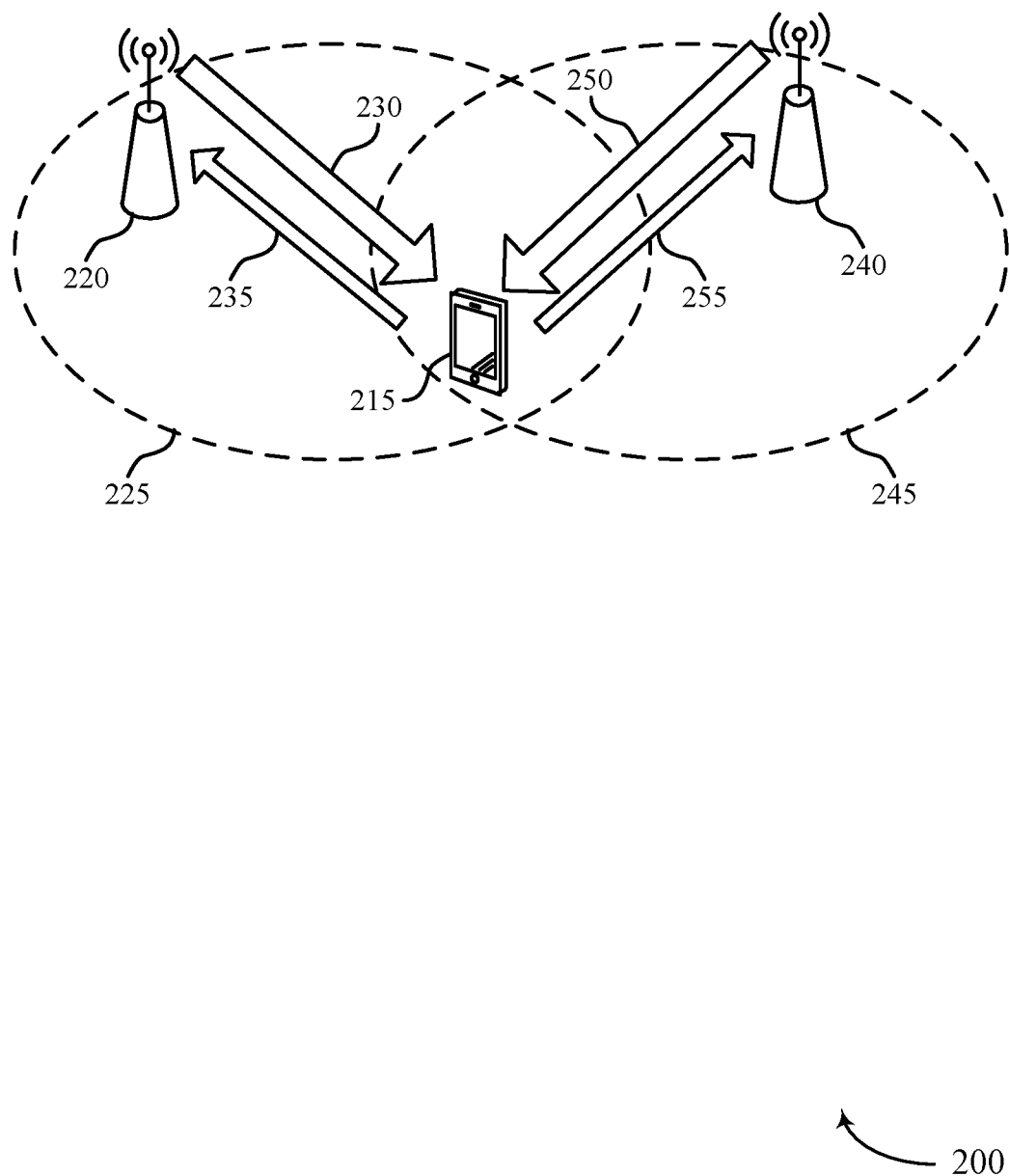
FIG. 2 illustrates aspects of a wireless communications subsystem that supports reporting joint HARQ feedback for multiple TRPs in accordance with various aspects of the present disclosure.

FIG. 2 illustrates aspects of a wireless communications subsystem that supports reporting joint HARQ feedback for multiple TRPs in accordance with various aspects of the present disclosure.

Wireless communications subsystem 200 may include UE 215 which may be examples of UE described with reference to FIG. 1. Wireless communications subsystem 200 may also include first TRP 220 and second TRP 240, which may be examples of a TRP discussed with reference to FIG. 1.

First TRP 220 may transmit information to UE 215 over first downlink 230 and UE 215 may transmit information to first TRP 220 over first uplink 235 within coverage area 225, as described with reference to FIG. 1. In some cases, first TRP 220 transmits DCI messages that indicate an assignment of resources on a first PDSCH for a transmission of transport blocks and/or code block groups to UE 215 via first downlink 230. In some cases, UE 215 reports HARQ feedback information for the transport blocks and/or code block groups to first TRP 220 via first uplink 235.

Second TRP 240 may transmit information to UE 215 over second downlink 250 and UE 215 may transmit information to second TRP 240 over second uplink 255 within coverage area 245, as described with reference to FIG. 1. In some cases, second TRP 240 transmits DCI messages that indicate an assignment of resources on a second PDSCH for a transmission of transport blocks and/or code block groups to UE 215 via second downlink 250. In some cases, UE 215 reports HARQ feedback information for the transport blocks and/or code block groups to second TRP 240 via second uplink 255.

As discussed above and herein, a wireless device may be unable to detect when four consecutive DCI messages (e.g., DCI messages having a cDAI of 3 to a cDAI of 6) are missed. In some cases, techniques for assigning cDAIs to DCI messages transmitted from multiple TRPs 145 over multiple component carriers may be determined that enable a wireless device to detect consecutively missed DCI messages.

To jointly assign cDAIs to DCI messages transmitted by multiple TRPs over multiple component carriers, cDAIs may be assigned to DCI messages first across TRPs, then across component carriers, and then across monitoring occasions. For example, a first set of cDAIs (e.g., {1, 2}) may be respectively assigned to the DCI messages transmitted by a first TRP 220 and a second TRP 240 using a first component carrier during a monitoring occasion and a second set of cDAIs (e.g., {3, 4}) may be respectively assigned to the DCI messages transmitted by the first TRP 220 and a second TRP 240 using a second component carrier during the monitoring occasion. Also, a tDAI may be assigned to the DCI messages transmitted during the monitoring occasion based on the total number of DCI messages transmitted in the monitoring occasion by all of the TRPs across all of the activated component carriers (e.g., tDAI=4).

Alternatively, to jointly assign cDAIs to DCI messages transmitted by multiple TRPs over multiple component carriers, cDAIs may be assigned first across component carriers, then across TRPs, and then across monitoring occasions. For example, a first set of cDAIs (e.g., {1, 2}) may be respectively assigned to a first DCI message transmitted by a first TRP 220 using a first component carrier and a second DCI message transmitted by the first TRP 220 using a second component carrier during a monitoring occasion. And a second set of cDAIs (e.g., {3, 4}) may be respectively assigned to a first DCI message transmitted by a second TRP 240 using the first component carrier and a second DCI message transmitted by the second TRP 240 using a second component carrier during the monitoring occasion. Also, a tDAI may be assigned to the DCI messages transmitted during the monitoring occasion based on the total number of DCI messages transmitted in the monitoring occasion by all of the TRPs across all of the activated component carriers (e.g., tDAI=4).

In some cases, the method for jointly assigning cDAIs to DCI messages transmitted by multiple TRPs over multiple component carriers may be selected based on a type of interference associated with a communication channel between the TRPs and a UE 215. For example, if a communication channel between a UE 215 and a first TRP 220 is likely, a base station 105 may assign cDAIs first across TRPs, then across component carriers, and then across monitoring occasions. By assigning cDAIs in this way, missing DCI messages may be identified even if four consecutive DCI messages transmitted from the first TRP 220 are missed. That is, if the cDAIs had been assigned first across component carriers and then TRPs, then the UE 215 may have been unable to detect that four consecutive DCI messages transmitted from the first TRP 220 are missed. In another example, if interference in one or more component carriers is likely, a base station 105 may assign cDAIs first across CCs, then across TRPs, and then across monitoring occasions. By assigning cDAIs in this way, missing DCI messages may be identified even if four consecutive DCI messages transmitted over two consecutive component carriers are missed. That is, if the cDAIs had been assigned first across TRPs and then CCs, then the UE 215 may have been unable to detect that four consecutive DCI messages in two consecutive CCs transmitted from the first TRP 220 and the second TRP 240 were missed.

In some cases, cDAIs may be separately assigned to DCI messages transmitted by multiple TRPs over multiple component carriers. As discussed above, when cDAIs are separately assigned to DCI messages transmitted by multiple TRPs, a wireless may be unable to determine an expected length of a HARQ feedback message scheduled to be transmit over PUSCH resources. Techniques for indicating and/or determining a length of a HARQ feedback message scheduled to be transmitted over PUSCH resources may be determined.

To indicate a length of a HARQ feedback message scheduled to be received over PUSCH resources, tDAI fields in an uplink DCI message may be added or modified to support HARQ feedback reporting for transport blocks and/or code block groups transmitted by multiple TRPs over multiple component carriers. For example, an uplink DCI message may be configured to include a first tDAI field that indicates a total number of DCI messages scheduling transport blocks and transmitted by a first TRP 220 during a first time period. Also, the uplink DCI message may be configured to include a second tDAI field that indicates a total number of DCI messages scheduling transport blocks and transmitted by a second TRP 240 during the first time period. To support code block group-based HARQ feedback, the first uplink DCI message may be further configured to include a third tDAI field that indicates a total number DCI messages scheduling transport blocks that are partitioned into code blocks and transmitted from the first TRP 220 and a fourth tDAI field that indicates a total number of DCI messages scheduling transport blocks that are partitioned into code blocks and transmitted from the second TRP 240. To determine a length of the HARQ feedback message, a UE 215 that receives the uplink DCI message may add the tDAI values indicated in the uplink DCI message.

In another example, an uplink DCI message may be configured to include a first tDAI field that indicates a total number of DCI messages scheduling transport blocks and transmitted by one of a first TRP 220 or a second TRP 240 during a first time period. The uplink DCI message may also be configured with a second tDAI field that indicates a total number of DCI messages scheduling transport blocks that are partitioned into code blocks and transmitted from the selected TRP. In some cases, one of the first TRP 220 and the second TRP 240 is semi-statically selected for the tDAI fields. To determine the length of the HARQ feedback message, a UE 215 that receives the uplink DCI message may add the tDAI value(s) indicated in the uplink DCI message with a tDAI value indicated in the last DCI message received from the other TRP. For instance, if a UE 215 receives an uplink DCI messages that indicates a tDAI value of 2 for the first TRP 220 and a last DCI message received from the second TRP 240 indicates a tDAI value of 2, the UE 215 may determine that four A/N indicators are to be transmitted in the HARQ feedback message. In some cases, if one of the TRPs does not transmit any DCI messages requesting HARQ feedback, then the tDAI field(s) in the uplink scheduling grant may be used for the TRP that does transmit DCI messages requesting HARQ feedback.

In another example, an uplink DCI message may be configured to include a first tDAI field that indicates a total number of DCI messages scheduling transport blocks and transmitted by both of a first TRP 220 and a second TRP 240 during a first time period—i.e., the summation of the total number of DCI messages transmitted by the first TRP 220 and the total number of DCI messages transmitted by the second TRP 240. The uplink DCI message may also be configured with a second tDAI field that a total number of DCI messages scheduling code block groups and transmitted by both of a first TRP 220 and a second TRP 240 during a first time period. To determine the length of the HARQ feedback message, a UE 215 that receives the uplink DCI message may use the value indicated by the tDAI field.

In another example, a UE 215 may determine a format used for an uplink DCI message based on whether code block group-based HARQ reporting is configured. For example, if code block group-based HARQ reporting is not configured, the UE 215 may determine that a first tDAI field in an uplink DCI message indicates a total number of DCI messages transmitted by a first TRP 220 in a period and that a second tDAI field in the uplink DCI message indicates a total number of DCI messages transmitted by a second TRP 240 in the period. But if code block group-based HARQ reporting is configured, the UE 215 may determine that a first tDAI field in an uplink DCI message indicates a total number of DCI messages associated with transport block-based HARQ reporting transmitted by a first TRP 220 in a period and that a second tDAI field in the uplink DCI message indicates a total number of DCI messages associated with code block group-based HARQ reporting transmitted by the first TRP 220 in the period. In an alternative example, if code block group-based HARQ reporting is configured, the UE 215 may determine that a first tDAI field in an uplink DCI message indicates a total number of DCI messages associated with transport block-based HARQ reporting transmitted by a first TRP 220 and a second TRP 240 in a period and that a second tDAI field in the uplink DCI message indicates a total number of DCI messages associated with code block group-based HARQ reporting transmitted by the first TRP 220 and the second TRP 240 in the period. By utilizing the first and second tDAI fields of an uplink DCI message differently based on whether code block group-based HARQ reporting is configured, an uplink DCI message may be configured two include a maximum of two tDAI fields.

Figure 3:
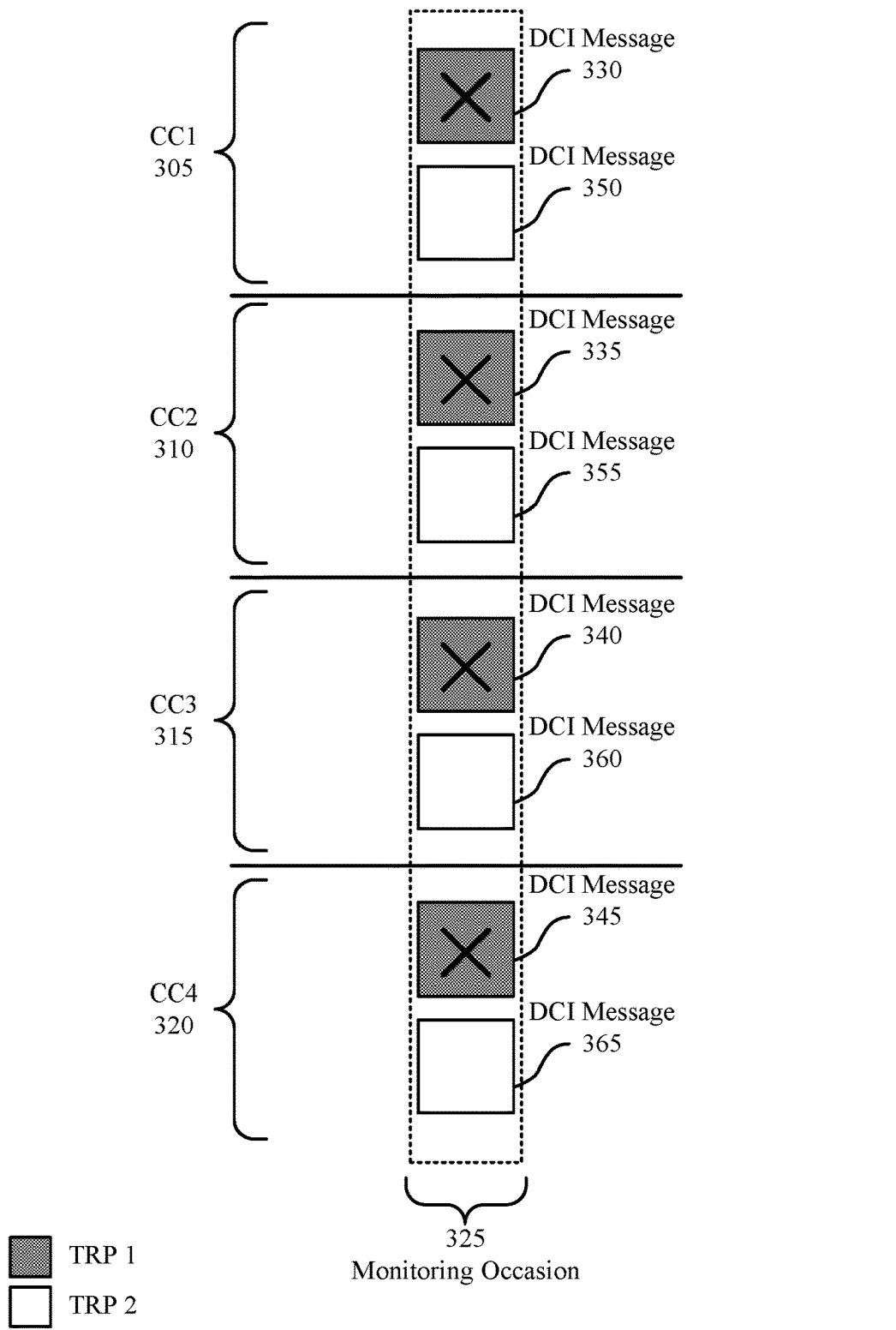
FIG. 3 illustrates aspects of a resource map that supports reporting joint HARQ feedback for multiple TRPs in accordance with various aspects of the present disclosure.

FIG. 3 illustrates aspects of a resource map that supports reporting joint HARQ feedback for multiple TRPs in accordance with various aspects of the present disclosure.

Resource map 300 may represent transmissions of DCI messages by multiple TRPs over wireless resources using multiple component carriers. In some cases, resource map 300 may represent the transmissions of DCI messages that are assigned cDAI field across TRPs, then component carriers, and then monitoring occasions. Resource map 300 may further represent a scenario in which four consecutive DCI messages transmitted from one TRP are missed by a UE.

Resource map 300 may depict first CC 305, second CC 310, third CC 315, and fourth CC 320. Resource map 300 may also depict a monitoring occasion 325 for a control channel, in addition to first TRP1 DCI message 330, second TRP1 DCI message 335, third TRP1 DCI message 340, and fourth TRP1 DCI message 345 transmitted by a first TRP, and first TRP2 DCI message 350, second TRP2 DCI message 355, third TRP2 DCI message 360, and fourth TRP2 DCI message 365 transmitted by a second TRP.

First TRP1 DCI message 330 and first TRP2 DCI message 350 may be transmitted using first CC 305. Second TRP1 DCI message 335 and second TRP2 DCI message 355 may be transmitted using second CC 310. Third TRP1 DCI message 340 and first TRP2 DCI message 360 may be transmitted using third CC 315. Fourth TRP1 DCI message 345 and fourth TRP2 DCI message 365 may be transmitted using fourth CC 320. In some cases, first TRP1 DCI message 330, second TRP1 DCI message 335, third TRP1 DCI message 340, and fourth TRP1 DCI message 345 may be transmitted using CORESETs from a first CORESET group. In some cases, the first CORESET group is associated with the first TRP—e.g., a UE may determine that a DCI message transmitted using the first CORESET group is transmitted from the first TRP. Similarly, first TRP2 DCI message 350, second TRP2 DCI message 355, third TRP2 DCI message 360, and fourth TRP2 DCI message 365 may be transmitted using CORESETs from a second CORESET group that is associated with the second TRP.

Each of the DCI messages may include a cDAI field and values may be assigned to each cDAI field based on a method for assigning cDAIs. In some cases, values for the cDAI field may be assigned across TRPs and then component carriers. For example, the value 00 (or 1) may be assigned to first TRP1 DCI message 330 and the value 01 (or 2) may be assigned to first TRP2 DCI message 350 in first CC 305. Next, the value 10 (or 3) may be assigned to second TRP1 DCI message 335 and the value 11 (or 4) may be assigned to second TRP2 DCI message 355 in second CC 310. Next, the value 00 (or 5) may be assigned to third TRP1 DCI message 340 and the value 01 (or 6) may be assigned to third TRP2 DCI message 360 in third CC 315. Last, the value 10 (or 7) may be assigned to fourth TRP1 DCI message 345 and the value 11 (or 8) may be assigned to fourth TRP2 DCI message 365 in fourth CC 320. In some cases, a tDAI field in each of the DCI messages transmitted during monitoring occasion 325 may be assigned a value of 11 (or 8) corresponding to the eight DCI messages transmitted during monitoring occasion 325. The values assigned to cDAI fields in DCI messages in a next monitoring occasion may follow from the values assigned to DCI messages in monitoring occasion 325—e.g., a DCI message transmitted by the first TRP in first CC 305 in the next monitoring occasion may be assigned the value 00 (or 9) based on fourth TRP2 DCI message 365 being assigned the value 11 (or 8).

In some cases, a UE may fail to detect and/or receive one or more of the DCI messages transmitted in monitoring occasion 325—i.e., the UE may miss the one or more DCI messages. For example, if there is interference affecting the link between the first TRP and the UE during monitoring occasion 325, the UE may not receive any of first TRP1 DCI message 330, second TRP1 DCI message 335, third TRP1 DCI message 340, and fourth TRP1 DCI message 345 transmitted by the first TRP. By assigning cDAI values to the DCI messages transmitted during monitoring occasion 325 first across TRPs and then CCs, the UE may be able to detect the missing DCI messages even though only two bits are used to convey the cDAI value. That is, the UE may obtain the value 01 after decoding first TRP2 DCI message 350 in first CC 305, the value 11 after decoding second TRP2 DCI message 355 in second CC 310, the value 01 after decoding third TRP2 DCI message 360 in third CC 315, and the value 11 after decoding fourth TRP2 DCI message 365 in fourth CC 320. The UE may determine that the decoded values are not in sequence and may determine that DCI messages associated with the first TRP were missed.

Similarly, if UE misses all of first TRP2 DCI message 350, second TRP2 DCI message 355, third TRP2 DCI message 360, and fourth TRP2 DCI message 330, the UE may obtain the value 00 after decoding first TRP1 DCI message 330 in first CC 305, the value 10 after decoding second TRP1 DCI message 335 in second CC 310, the value 00 after decoding third TRP1 DCI message 340 in third CC 315, and the value 10 after decoding fourth TRP1 DCI message 345 in fourth CC 320. In some cases, the UE may determine that the decoded values are not in sequence and may determine that DCI messages associated with the first TRP were missed. The UE may also determine that a DCI message assigned an index after fourth TRP1 message 345 was missed based on a value of a tDAI field in any of the received DCI messages being 11.

In some cases, first TRP and/or second TRP may transmit DCI messages in a subset of the component carriers. In such cases, the method for assigning cDAI values may remain the same, sequentially assigning cDAI values to DCI messages transmitted using a component carrier in the order of represented TRPs.

Figure 4:
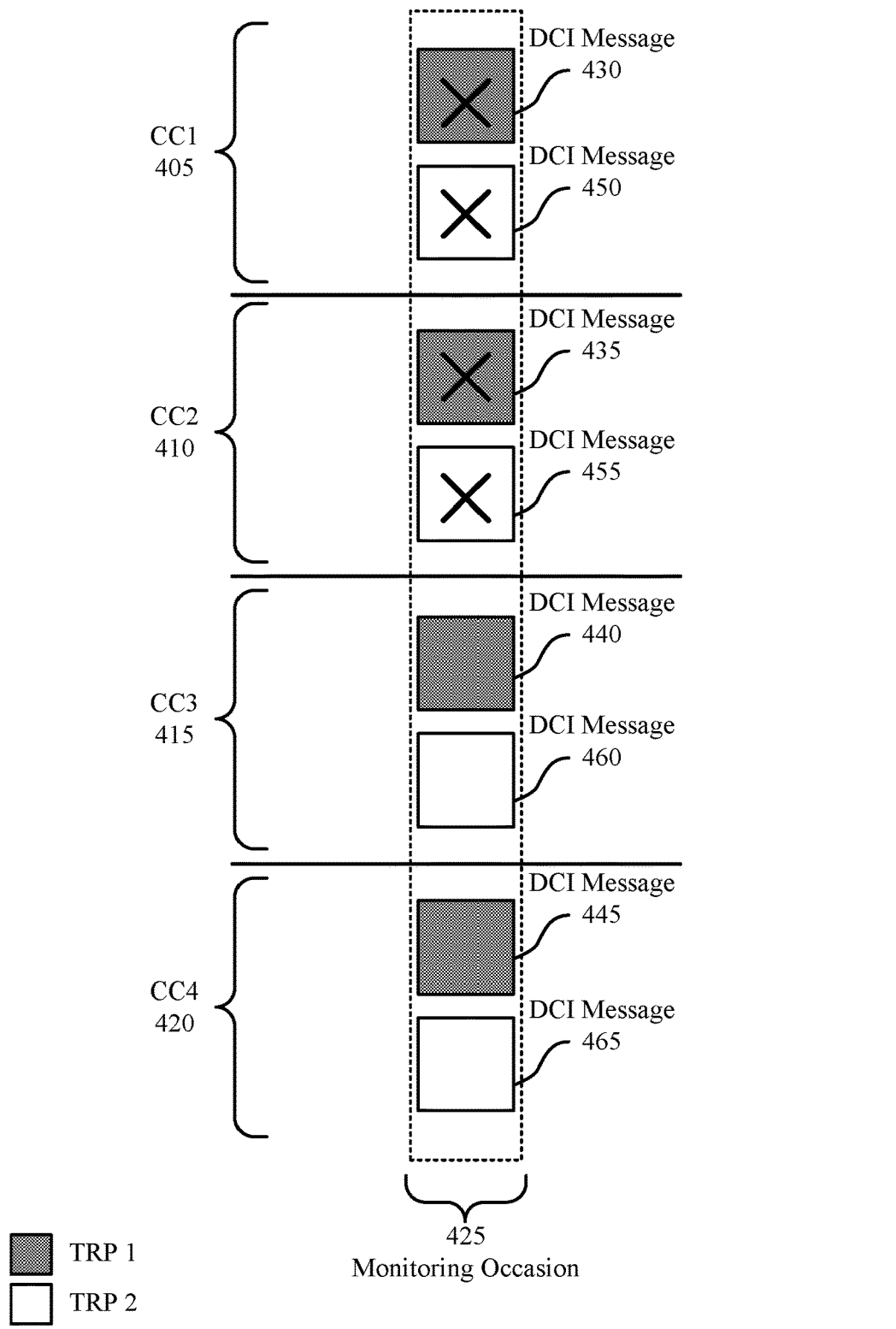
FIG. 4 illustrates aspects of a resource map that supports reporting joint HARQ feedback for multiple TRPs in accordance with various aspects of the present disclosure.

FIG. 4 illustrates aspects of a resource map that supports reporting joint HARQ feedback for multiple TRPs in accordance with various aspects of the present disclosure.

Resource map 400 may represent transmissions of DCI messages by multiple TRPs over wireless resources using multiple component carriers. In some cases, resource map 400 may represent the transmissions of DCI messages that are assigned cDAI field across component carriers, then TRPs, and then monitoring occasions. Resource map 400 may further represent a scenario in which four DCI messages transmitted in two consecutive component carriers are missed by a UE.

Resource map 400 may depict first CC 405, second CC 410, third CC 415, and fourth CC 420. Resource map 400 may also depict a monitoring occasion 425 for a control channel, in addition to first TRP1 DCI message 430, second TRP1 DCI message 435, third TRP1 DCI message 440, and fourth TRP1 DCI message 445 transmitted by a first TRP and first TRP2 DCI message 450, second TRP2 DCI message 455, third TRP2 DCI message 460, and fourth TRP2 DCI message 465 transmitted by a second TRP.

First TRP1 DCI message 430 and first TRP2 DCI message 450 may be transmitted using first CC 405. Second TRP1 DCI message 435 and second TRP2 DCI message 455 may be transmitted using second CC 410. Third TRP1 DCI message 440 and first TRP2 DCI message 460 may be transmitted using third CC 415. Fourth TRP1 DCI message 445 and fourth TRP2 DCI message 465 may be transmitted using fourth CC 420. In some cases, first TRP1 DCI message 430, second TRP1 DCI message 435, third TRP1 DCI message 440, and fourth TRP1 DCI message 445 may be transmitted using CORESETs from a first CORESET group. In some cases, the first CORESET group is associated with the first TRP—e.g., a UE may determine that a DCI message transmitted using the first CORESET group is transmitted from the first TRP. Similarly, first TRP2 DCI message 450, second TRP2 DCI message 455, third TRP2 DCI message 460, and fourth TRP2 DCI message 465 may be transmitted using CORESETs from a second CORESET group that is associated with the second TRP.

Each of the DCI messages may include a cDAI field and values may be assigned to each cDAI field based on a method for assigning cDAIs. In some cases, values for the cDAI field may be assigned across component carriers and then TRPs. For example, the value 00 (or 1) may be assigned to first TRP1 DCI message 430 in first CC 405, the value 01 (or 2) may be assigned to second TRP1 DCI message 435 in second CC 410, the value 10 (or 3) may be assigned to third TRP1 DCI message 440 in third CC 415, and the value 11 (or 4) may be assigned to fourth TRP1 DCI message 445 in fourth CC 420. Also, the value 00 (or 5) may be assigned to first TRP2 DCI message 450 in first CC 405 (based on the value 11 (or 4) being assigned to fourth TRP1 DCI message 430), the value 01 (or 6) may be assigned to second TRP2 DCI message 455 in second CC 410, the value 10 (or 7) may be assigned to third TRP2 DCI message 460 in third CC 415, and the value 11 (or 8) may be assigned to fourth TRP2 DCI message 465 in fourth CC 420. In some cases, a tDAI field in each of the DCI messages transmitted during monitoring occasion 425 may be assigned a value of 11 (or 8) corresponding to the eight DCI messages transmitted during monitoring occasion 425. The values assigned to cDAI fields in DCI messages in a next monitoring occasion may follow from the values assigned to DCI messages in monitoring occasion 425—e.g., a DCI message transmitted by first TRP in first CC 405 in the next monitoring occasion may be assigned the value 00 (or 9) based on fourth TRP2 DCI message 465 being assigned the value 11 (or 8).

In some cases, a UE may fail to detect and/or receive one or more of the DCI messages transmitted in monitoring occasion 425—i.e., the UE may miss the one or more DCI messages. For example, if there is interference affecting the first CC 305 and the second CC 310 during monitoring occasion 425, the UE may not receive first TRP1 DCI message 430 and second TRP1 DCI message 435 transmitted by the first TRP, in addition to first TRP2 DCI message 450, and second TRP2 DCI message 445 transmitted by the second TRP. By assigning cDAI values to the DCI messages transmitted during monitoring occasion 425 first across TRPs and then CCs, the UE may be able to detect the missing DCI messages even though only two bits are used to convey the cDAI value. That is, the UE may obtain the value 10 after decoding third TRP1 DCI message 440 in third CC 415, the value 10 after decoding third TRP2 DCI message 460 in third CC 415, the value 11 after decoding fourth TRP1 DCI message 445 in fourth CC 420, and the value 11 after decoding third TRP2 DCI message 465 in fourth CC 420. The UE may determine that the decoded values are not in sequence and may determine that DCI messages associated with the first TRP and the second TRP were missed.

Similarly, if there is interference affecting the third CC 415 and the fourth CC 320, the UE may obtain the value 00 after decoding first TRP1 DCI message 430 in first CC 405, the value 00 after decoding first TRP2 DCI message 450 in first CC 405, the value 01 after decoding second TRP1 DCI message 435 in second CC 410, and the value 01 after decoding second TRP2 DCI message 455 in second CC 410. The UE may also determine that DCI messages assigned an index after second TRP1 message 335 and second TRP2 message 355 was missed based on a value of a tDAI field in any of the received DCI messages being 11.

In some cases, first TRP and/or second TRP may transmit DCI messages in a subset of the component carriers. In such cases, the method for assigning cDAI values may remain the same, sequentially assigning cDAI values to DCI messages of a given TRP transmitted in the order of represented TRPs.

Figure 5:
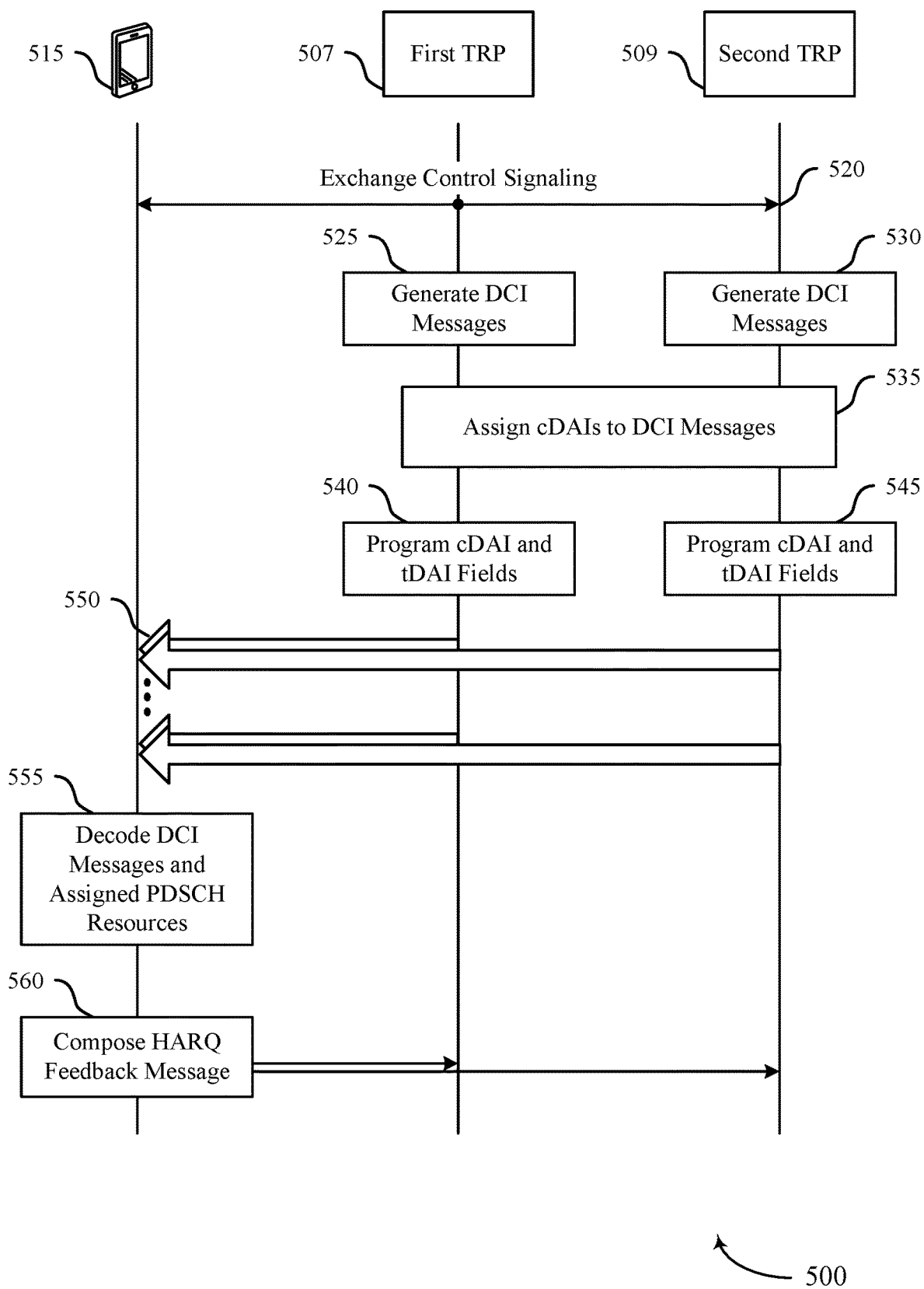
FIG. 5 illustrates aspects of a process for reporting joint HARQ feedback for multiple TRPs in accordance with various aspects of the present disclosure.

FIG. 5 illustrates aspects of a process for reporting joint HARQ feedback for multiple TRPs in accordance with various aspects of the present disclosure.

Process flow 500 may be performed by UE 515 which may be an example of a UE as described herein and with reference to FIGS. 1 through 4. Process flow 500 may also be performed by first TRP 507 and second TRP 509, which may be examples of TRPs as described herein and with reference to FIGS. 1 through 4.

In some examples, process flow 500 illustrates the joint assignment of cDAIs to DCI messages transmitted from multiple TRPs.

At arrow 520, UE 515, first TRP 507, and second TRP 509 may exchange control signaling (e.g., RRC or PDCCH control signaling). In some cases, UE 515 may transmit, to first TRP 507, second TRP 509, and/or a base station coupled with first TRP 507 and/or second TRP 509, a capability to receive transmissions from multiple TRPs. In some cases, UE 515 may also transmit a capability to receive transmissions from multiple TRPs that transmit using separate DCI and PDSCHs.

In some cases, UE 515 may receive, from first TRP 507, second TRP 509, and/or a base station coupled with first TRP 507 and/or second TRP 509, an RRC message that configures UE 515 to establish a connection with first TRP 507 and second TRP 509. In some cases, UE 515 may also receive an RRC message configuring UE 515 to receive a first set of downlink control information messages from first TRP 507 that indicate resources in a first PDSCH used by first TRP 507 and a second set of downlink control information messages from second TRP 509 that indicate resources in a second PDSCH used by second TRP 509. In some cases, UE 515 may also receive an RRC message that configures UE 515 to dynamically generate a HARQ feedback message for transmissions from first TRP 507 and second TRP 509—that is, UE 515 may be configured to a joint HARQ feedback message.

After exchanging the control signaling, UE 515 may establish a connection with first TRP 507 and second TRP 509.

At block 525, first TRP 507 may generate a first set of DCI messages associated with a first set of transport blocks to be transmitted from first TRP 507 to UE 515 over a first PDSCH. In some examples, the first set of DCI messages may be scheduled to be transmitted during a first PDCCH monitoring occasion. In other examples, the first set of transport blocks may be scheduled to be transmitted in multiple PDCCH monitoring occasions. The first set of DCI messages may also be transmitted using one or more component carriers.

In some cases, first TRP 507 may generate a second set of DCI messages associated with a second set of code block groups to be transmitted from first TRP 507 to UE 515 over the first PDSCH. The second set of DCI messages may similarly be transmitted in one or multiple PDCCH monitoring occasions and using one or more component carriers. In some cases, all or a portion of the first and second set of DCI messages may be transmitted in a single monitoring occasion.

At block 530, second TRP 509 may generate a first set of DCI messages associated with a first set of transport blocks to be transmitted from second TRP 509 to UE 515 over a second PDSCH. In some examples, the first set of DCI messages may be scheduled to be transmitted during a first PDCCH monitoring occasion. In other examples, the first set of transport blocks may be scheduled to be transmitted in multiple PDCCH monitoring occasions. The first set of DCI messages may also be transmitted using one or more component carriers.

In some cases, second TRP 509 may generate a second set of DCI messages associated with a second set of code block groups to be transmitted from second TRP 509 to UE 515 over the second PDSCH. The second set of DCI messages may similarly be transmitted in one or multiple PDCCH monitoring occasions and using one or more component carriers. In some cases, all or a portion of the first and second set of DCI messages transmitted from first TRP 507 and the first and second set of DCI messages transmitted from second TRP 509 may be transmitted in a single monitoring occasion. In some cases, the DCI messages generated by first TRP 507 and second TRP 609 may be DL DCI messages.

At block 535, cDAIs may be assigned to the DCI messages generated by first TRP 507 and second TRP 509. In some cases, a base station that is coupled with first TRP 507 and second TRP 509 assigns cDAI values to the DCI messages. In other cases, first TRP 507 and second TRP 509 coordinate with one another to assign cDAI values to the DCI messages.

In some examples, cDAIs are jointly assigned to the DCI messages. That is, all of the DCI messages generated by first TRP 507 and second TRP 509 may be combined and sequentially assigned cDAI values in accordance with a method for assigning cDAI values to DCI messages. In some cases, jointly assigning cDAI values to the combined DCI messages includes assigning cDAI values to DCI messages first across TRPs, then across CCs, and then across monitoring occasions. That is, within a monitoring occasion and using a first component carrier, a first cDAI value (e.g., 1) may be assigned to a DCI message transmitted from first TRP 507 and a following cDAI value (e.g., 2) may be assigned to a DCI message transmitted from second TRP 509. In some cases, another cDAI value (e.g., 3) may be assigned to a DCI message transmitted from a third TRP using the first component carrier. Next, within the monitoring occasion and using a second component carrier, the following cDAI value (e.g., 3) may be assigned to a DCI message transmitted from first TRP 507 and another cDAI value (e.g., 4) may be assigned to a DCI message transmitted from second TRP 509, and so on. In some examples, second TRP 509 does not transmit a DCI message using the second component carrier and within the monitoring occasions and in a third component carrier, the other cDAI value (e.g., 4) may be assigned to a DCI message transmitted from first TRP 507. In a next monitoring occasions, cDAI values may be similarly assigned to DCI messages starting from the value after the last cDAI value assigned in the previous monitoring occasion.

In some cases, jointly assigning cDAI values to the combined DCI messages includes assigning cDAI values to DCI messages first across CCs, then across TRPs, and then across monitoring occasions. That is, a first number of cDAI values may be assigned to all of the DCI messages transmitted from first TRP 507 within the monitoring occasion and a following number of cDAI values may be assigned to all of the DCI messages transmitted from second TRP 509 within the monitoring occasion. For example, if first TRP 507 transmits, in a monitoring occasions, four DCI messages using four component carriers, cDAI values one through four may be assigned to the four DCI messages. And if second TRP 509 transmits, in the monitoring occasions, four DCI messages using four component carriers, cDAI values five through eight may be assigned to the four DCI messages. In a next monitoring occasions, cDAI values may be similarly assigned to DCI messages starting from the last cDAI value assigned in the previous monitoring occasion.

In some cases, the method for jointly assigning cDAI values may be determined based on a type of channel interference that has been detected or is likely within a communications path between UE 515, first TRP 507, and second TRP 509. For example, if a certain level of interference has been detected as affecting a link between UE 515 and first TRP 507, cDAI values may be jointly assigned across TRPs, then CCs, and then monitoring occasions—e.g., as discussed with reference to FIG. 3. By assigning cDAI values this way, UE 515 may detect when four consecutive DCI messages transmitted from first TRP 507 are missed—e.g., when modulo 4 operation is used for programming cDAI values. In another example, if certain level of interference has been detected as affecting consecutive component carriers used for communications between UE 515, first TRP 507, and second TRP 509, cDAI values may be jointly assigned across CCs, then TRPs, and then monitoring occasions—e.g., as discussed with reference to FIG. 4. In some cases, the network (e.g., first TRP 507, second TRP 509, and/or a base station coupled with first TRP 507 and/or second TRP 509) may select the method for jointly assigning cDAI values and may signal the selected method to UE 515—e.g., in RRC signaling. In other cases, the network and UE 515 may independently determine which method is used for jointly assigning cDAI values based on channel measurements and a common set of rules for determining which method to use.

At block 540, first TRP 507 may program cDAI and/or tDAI fields in the DCI messages transmitted from first TRP 507. In some cases, the cDAI fields may be programmed in accordance with the method used for assigning cDAI values. In some cases, the cDAI fields may include two bits and programming an assigned cDAI value to a cDAI field may involve applying a modulo 4 operation to the cDAI values before programming the corresponding cDAI fields. For example, if a cDAI value of 1 has been assigned to a DCI message, a cDAI field in the DCI message may be programmed to be 00, and if a cDAI value of 5 has been assigned to a DCI message, a cDAI field in the DCI message may also be programmed to be 00.

First TRP 507 may also program a tDAI field in the DCI messages transmitted from first TRP 507 based on a total number (or summation) of DCI messages that are transmitted from both first TRP 507 and second TRP 509 during a monitoring occasion. For example, if eight DCI messages are transmitted from first TRP 507 and second TRP 509 during a monitoring occasion, a tDAI field in each of the DCI message may be programmed to be 11. First TRP 507 may also assign a tDAI value to the DCI messages in a second monitoring occasion that is equal to the summation of the total number of DCI messages generated by first TRP 607 and second TRP 509 in the first monitoring occasion and the second monitoring occasion. In some cases, the total number of DCI messages indicated in a tDAI field is based on the total number of DCI messages transmitted during a certain period—e.g., in a time period between a first scheduled HARQ feedback resource and a second scheduled HARQ feedback resource.

At block 545, second TRP 509 may similarly program cDAI fields in the DCI messages transmitted from second TRP 509 in accordance with the method used for assigning cDAI values. Second TRP 509 may also program tDAI fields in the DCI messages transmitted from second TRP 509 based on a total number (or summation) of DCI messages transmitted from both first TRP 507 and second TRP 509 during a monitoring occasion.

At arrow 550, first TRP 507 and second TRP 509 may perform transmissions to UE 515 using multiple component carriers and multiple PDSCHs. In some cases, first TRP 507 transmits a first set of DCI messages using the multiple component carriers during one or more monitoring occasions and second TRP 509 transmits a second set of DCI messages using the multiple component carriers during all or a portion of the one or more monitoring occasions. UE 515 may monitor the monitoring occasions for DCI messages intended for UE 515—e.g., by blindly decoding PDCCH resources and descrambling an assumed CRC field with a unique identifier associated with UE 515.

In some cases, UE 515 may monitor a first group of CORESETs and a second group of CORESETs for DCI messages. In some examples, the first group of CORESETs may be assigned a first index which may be associated with first TRP 507 and the second group of CORESETs may be assigned a second index which may be associated with second TRP 509. In some cases, UE 515 may be assigned the first and second groups of CORESETs in RRC signaling and may determine that transmissions received over the first group of CORESETs are from first TRP 507 and transmissions received over the second group of CORESETs are from second TRP 509.

At block 555, UE 515 may decode the DCI messages that are detected during the monitoring occasions and may attempt to decode the PDSCH resources indicated by the DCI messages. In some cases, UE 515 may fail to detect (or "miss") DCI messages transmitted from first TRP 507 and/or second TRP 509. In some cases, UE 515 may detect DCI messages transmitted from first TRP 507 and/or second TRP 509 but may fail to decode a transport block indicated by the detected DCI messages. In some cases, UE 515 may detect DCI messages transmitted from first TRP 507 and/or second TRP 509 and may successfully decode a transport block indicated by the detected DCI messages.

At block 560, UE 515 may dynamically compose a HARQ feedback message based on the received DCI messages, the missed DCI messages, and the decoding of assigned PDSCH resources. In some cases, decoding the DCI messages may include determining a cDAI value and/or tDAI value for each of the decoded DCI messages. In some cases, after decoding all of the detected DCI messages, UE 515 may arrange the DCI messages based on the cDAI values and may compose a HARQ feedback message based on the arrangement. That is, the HARQ feedback message may be composed so that a first A/N indicator corresponds to a transport block indicated by the sequentially first DCI messages, a second A/N indicator corresponds to a transport block indicated by the sequentially first DCI messages, and so on.

In some cases, while arranging the DCI messages, UE 515 may determine that a DCI message was missed—e.g., based on determining that a cDAI value was missed. For instance, UE 515 may determine that a DCI message was missed if cDAI values 00, 01, and 11 are decoded from the detected DCI messages. In some cases, UE 515 may arrange the decoded DL DCI messages based on the method used to assign the cDAI values to the DCI messages. For example, UE 515 may arrange detected cDAI values for DCI messages that are received first across TRPs, then across CCs, and then across monitoring occasions. In another example, UE 515 may arrange detected cDAI values for DCI messages that are received first across CCs, then across TRPs, and then across monitoring occasions. UE 515 may also determine that a DCI messages was missed based on the tDAI value. For example, if a tDAI field of the last arranged DCI message received by UE 515 does not match the tDAI field of any of the detected DCI messages, UE 515 may determine that a DCI message was missed. In another case, if UE 515 counts all of the detected DCI messages received in a monitoring occasion and the counted value does not correspond to the tDAI field of any of the detected DCI messages, UE 515 may determine that a DCI message was missed.

After identifying any missed DCI messages that were configured to request HARQ feedback, UE 515 may compose the HARQ feedback message and may include an A/N indicator field for the missed DCI messages. In some cases, UE 515 may indicate a NACK in the A/N indicator field for the missed DCI messages. By including an A/N indicator field for the missed DCI messages, UE 515 may transmit a HARQ feedback message having a size and payload expected by a base station, first TRP 507, and/or second TRP 509. After composing the HARQ feedback message, UE 515 may transmit the HARQ feedback message to a base station, first TRP 507, and/or second TRP 509—e.g., using a scheduled PUCCH resource.

Figure 6:
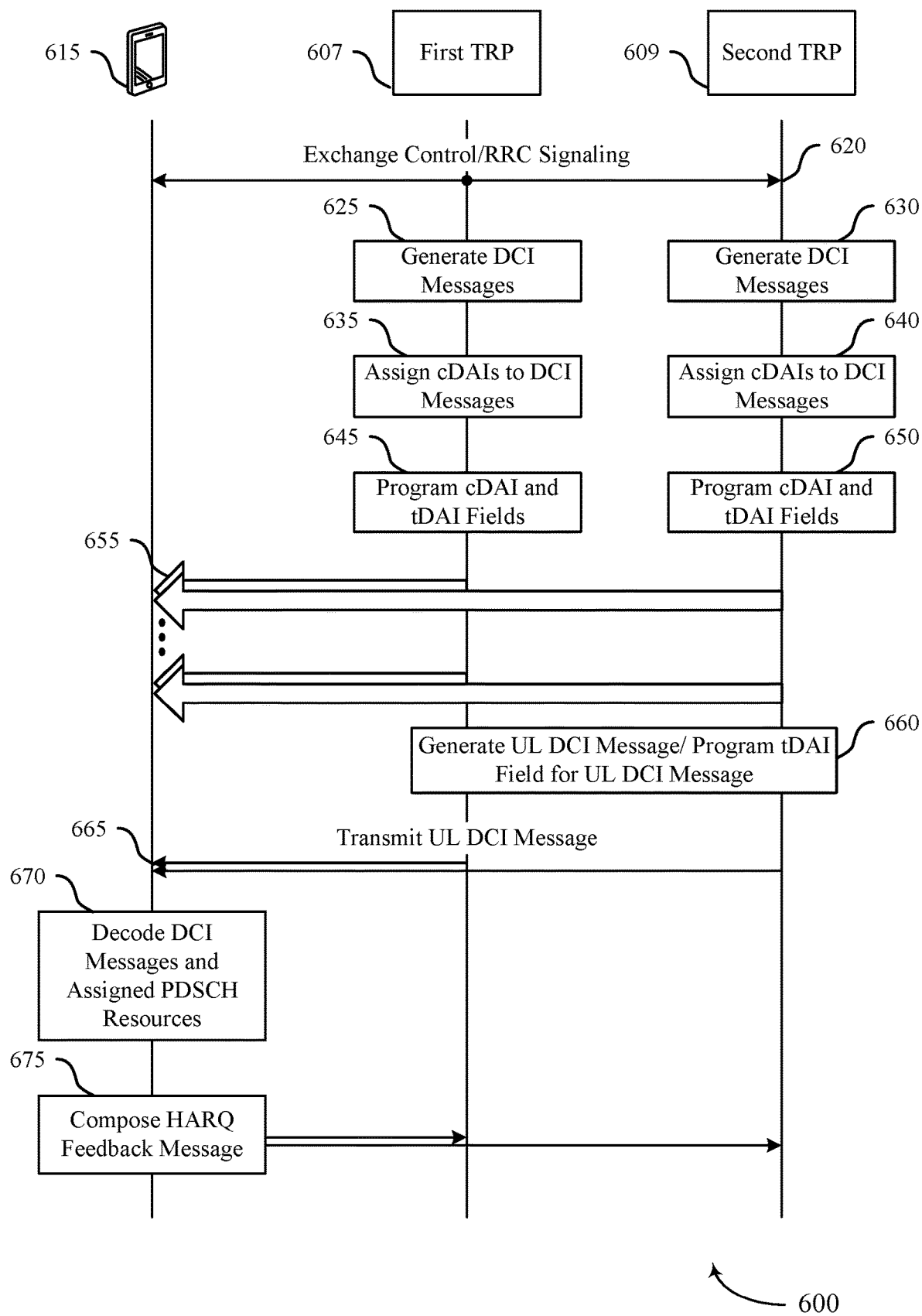
FIG. 6 illustrates aspects of a process for reporting joint HARQ feedback for multiple TRPs in accordance with various aspects of the present disclosure.

FIG. 6 illustrates aspects of a process for reporting joint HARQ feedback for multiple TRPs in accordance with various aspects of the present disclosure.

Process flow 600 may be performed by UE 515 which may be an example of a UE as described herein and with reference to FIGS. 1 through 5. Process flow 600 may also be performed by first TRP 507 and second TRP 509, which may be examples of TRPs as described herein and with reference to FIGS. 1 through 5.

In some examples, process flow 500 illustrates the separate assignment of cDAIs to DCI messages transmitted from multiple TRPs and the indication of a total size of a HARQ feedback message scheduled during PDSCH resources.

At arrow 620, UE 615, first TRP 607, and second TRP 609 may exchange control signaling as similarly described with reference to arrow 520 of FIG. 5. At block 625, first TRP 607 may generate DCI messages (or DL DCI messages) as similarly described with reference to block 525 of FIG. 5. At block 630, second TRP 609 may generate DCI messages (or DL DCI messages) as similarly described with reference to block 530 of FIG. 5.

At block 635 and block 640, first TRP 607 and second TRP 609 may separately assign cDAIs to the DCI messages generated by first TRP 607 and second TRP 609. At block 635, first TRP 607 may assign cDAIs to the DCI messages generated by first TRP 607. For example, first TRP 607 may assign, within a first monitoring occasion, a first cDAI value to a first DCI message using a first component carrier (CC0), a second DCI message to a second component carrier (CC1), and so on. First TRP 607 may similarly assign cDAI values in a second monitoring occasion starting from the value after the last value assigned in the previous monitoring occasion. In some cases, first TRP 607 may determine a tDAI value for the DCI messages generated by first TRP 607. For example, first TRP 607 may assign a tDAI value that is equal to the total number of DCI messages generated by first TRP 607 in a first monitoring occasion. First TRP 607 may also assign a tDAI value that is equal to the DCI messages in a second monitoring occasion summation of the total number of DCI messages generated by first TRP 607 in the first monitoring occasion and the second monitoring occasion. At block 640, second TRP 609 may assign cDAIs and/or tDAIs to the DCI messages generated by second TRP 609 in a similar fashion as, and independently from, first TRP 607.

At block 645, first TRP 607 may program cDAI and tDAI fields in the DCI messages generated by first TRP 607. In some cases, the cDAI field may include two bits. In some cases, the tDAI field may include two bits. In some cases, programming the cDAI fields includes applying a modulo 4 operation to an assigned value before programming the cDAI fields. At block 650, second TRP 609 may program cDAI and tDAI fields in the DCI messages generated by second TRP 609.

At arrow 655, first TRP 607 and second TRP 609 may perform transmissions to UE 615 using multiple component carriers and multiple PDSCHs as described with reference to arrow 550 of FIG. 5. And UE 615 may receive the DCI messages in a monitored CORESET as described with reference to arrow 550 of FIG. 5.

At block 660, an UL DCI message (e.g., a scheduling grant) that schedules PUSCH resources for UE 615 to transmit over may be generated by a base station, first TRP 607, and/or second TRP 609. In some cases, the UL DCI message may also schedule UE 615 to transmit a HARQ feedback message over the scheduled PUSCH resources. To protect an uplink data transmission, the UL DCI message may include a tDAI field that indicates a size of the HARQ feedback message expected by the network. That is, if a HARQ feedback message that exceeds or fall short of its expected size is transmitted by UE 615, a receiving device (e.g., a base station) may be unable to decode the HARQ feedback message and a data transmission over the PUSCH resources. By including the tDAI field in the UL DCI message, UE 615 may transmit a HARQ feedback message that matches its expected size, and the network may be able to decode at least a data transmission over the PUSCH resources.

In some cases, UE 615 uses the tDAI field to indicate a total number of DCI messages transmitted from first TRP 607 or a total number of DCI messages transmitted from second TRP 609, or both. For example, the UL DCI message may include a first tDAI field that indicates a total number of DCI messages (and/or corresponding transport blocks) transmitted from first TRP 607 and a second tDAI field that indicates a total number of DCI messages transmitted from second TRP 609. In some cases—e.g., if first TRP 607 and/or second TRP 609 uses code block group-based HARQ operation—the UL DCI message may include a third tDAI field that indicates a total number DCI messages scheduling transport blocks that are partitioned into code blocks and transmitted from first TRP 607 and a fourth tDAI field that indicates a total number DCI messages scheduling transport blocks that are partitioned into code blocks and transmitted from second TRP 609.

In another example, the UL DCI message includes a first tDAI field that indicates a total number of DCI messages transmitted from one of first TRP 607 and second TRP 609 (e.g., for first TRP 607). In some cases, the TRP selected for the first tDAI field may be fixed and indicated in RRC messaging to UE 615. In other cases, the TRP selected for the first tDAI field may be semi-statically fixed and may be changed using control signaling. In some cases, the UL DCI message may also include a second tDAI field that indicates a total number of DCI messages scheduling transport blocks partitioned into code block groups and transmitted from the selected one of first TRP 607 and second TRP 609. In such cases, UE 615 may determine the total number of DCI messages transmitted from the other of first TRP 607 and second TRP 609 based on a tDAI field included in the last DL DCI message detected from the other of first TRP 607 and second TRP 609 (e.g., for second TRP 609). In some cases, UE 615 may determine the total number of DCI messages scheduling transport blocks partitioned into code block groups and transmitted from the TRP selected for the other of first TRP 607 and second TRP 609 selected for the tDAI field based on a tDAI field included in the last DL DCI message detected from the other of first TRP 607 and second TRP 609.

In some cases, one of the TRPs (e.g., first TRP 607) may transmit DCI messages that do not request HARQ feedback, and the first and second tDAI fields may be associated with other TRP (e.g., second TRP 609). In some cases, an indication that one of the TRPs will not request HARQ feedback during a certain period may be indicated to UE 615.

In another example, the UL DCI message includes a first tDAI field that indicates a total number of DCI messages transmitted from both first TRP 607 and second TRP 609. In some cases, the UL DCI message also includes a second tDAI field that indicates a total number of DCI messages scheduling transport blocks partitioned into code block groups and transmitted from both first TRP 607 and second TRP 609.

In some examples, a format used for the UL DCI message depends on whether code block group-based HARQ feedback is configured. For example, if code block group-based HARQ feedback is not configured, the UL DCI message may use the format having a first tDAI field indicating a total number of DL DCI message transmitted from first TRP 607 and a second tDAI field indicating a total number of DL DCI messages transmitted from second TRP 609. Otherwise, if code block group-based HARQ feedback is configured, the UL DCI message may use the format having a first field that indicates a total number of DL DCI messages transmitted from a selected one of first TRP 607 or second TRP 609 and a second tDAI field that indicates a total number of DCI messages scheduling transport blocks partitioned into code block groups and transmitted from the selected one of first TRP 607 or second TRP 609. Alternatively, if code block group-based HARQ feedback is configured, the UL DCI message may use the format having a first field that indicates a total number of DL DCI messages transmitted from both of first TRP 607 and second TRP 609 and a second tDAI field that indicates a total number of DCI messages scheduling transport blocks partitioned into code block groups and transmitted from both of first TRP 607 and second TRP 609.

In some cases, the tDAI field(s) included in the UL DCI message may include two bits. When the tDAI field(s) includes two bits, a base station, first TRP 607, and/or second TRP 609 may apply a modulo 4 operation to an assigned tDAI value before programming the tDAI field(s). In some cases, the total number of DCI messages indicated in a tDAI field is based on the total number of DCI messages transmitted during a certain period—e.g., in a time period between a first scheduled HARQ feedback resource and a second scheduled HARQ feedback resource. By indicating the total number of DCI messages transmitted from first TRP 607 and second TRP 609 are not indicated separately, UE 615 may be able to identify missed DCI messages and/or determine which TRP a missed DCI message corresponds to.

At arrow 665, the UL DCI message may be transmitted to UE 115 by a base station, first TRP 607, and/or second TRP 609. In some cases, the UL DCI message may be transmitted over PDSCH resources during a monitoring occasion.

At block 670, UE 115 may decode the DL DCI messages and the UL DCI message detected during one or more monitoring occasions and may attempt to decode the PDSCH resources indicated by the DL DCI messages. In some cases, UE 615 may fail to detect (or "miss") DL DCI messages transmitted from first TRP 607 and/or second TRP 609. In some cases, UE 615 may detect DL DCI messages transmitted from first TRP 607 and/or second TRP 609 but may fail to decode a transport block indicated by the detected DL DCI messages. In some cases, UE 615 may detect DL DCI messages transmitted from first TRP 607 and/or second TRP 609 and may successfully decode a transport block indicated by the detected DL DCI messages. In some cases, UE 115 may determine that a HARQ feedback message is scheduled to be transmitted during PUSCH resources that are scheduled by the UL DCI message.

At block 675, UE 115 may dynamically compose a HARQ feedback message based on the received DL DCI messages, the received UL DCI message, and the decoding of assigned PDSCH resources. In some cases, after decoding all of the detected DCI messages, UE 615 may arrange the DL DCI messages based on the cDAI values and may compose a HARQ feedback message based on the arrangement. That is, the HARQ feedback message may be composed so that a first A/N indicator corresponds to a transport block indicated by the sequentially first DL DCI messages, a second A/N indicator corresponds to a transport block indicated by the sequentially first DL DCI messages, and so on.

In some cases, while arranging the DL DCI messages, UE 615 may determine that a DL DCI message was missed—e.g., based on determining that a cDAI value was missed. For instance, UE 615 may determine that a DL DCI message was missed if cDAI values 00, 01, and 11 are decoded from the detected DL DCI messages. In some cases, UE 615 may arrange the decoded DL DCI messages based on the method used to assign the cDAI values to the DL DCI messages. For example, UE 615 may include, in sequential order, all of the HARQ feedback messages for first TRP 607 and then all of the HARQ feedback messages for second TRP 609. UE 615 may also determine that a DL DCI messages was missed based on the tDAI value. For example, if a tDAI field of the last arranged DL DCI message received by UE 615 does not match the tDAI field of any of the detected DL DCI messages, UE 615 may determine that a DL DCI message was missed. In another case, if UE 615 counts all of the detected DL DCI messages received in a monitoring occasion and the counted value does not correspond to the tDAI field of any of the detected DL DCI messages, UE 615 may determine that a DL DCI message was missed.

UE 615 may also use the tDAI field included in the UL DCI message and/or a DL DCI message to determine a total length of the HARQ feedback message. By determining the total length of the HARQ feedback message scheduled during the PDSCH resources by the UL DCI message, UE 615 may transmit a HARQ feedback message that matches it expected size, allowing a receiving device to decode at least a data transmission over the PUSCH resources even if the generated HARQ feedback message is incorrect. Determining the size of the HARQ feedback message may be based on a format used by the UL DCI message. For example, if the UL DCI message includes a first tDAI field indicating a total number of DL DCI messages transmitted by first TRP 607 and a second tDAI field indicating a total number of DL DCI messages transmitted by second TRP 609, then UE 615 may determine a total size of the HARQ feedback message based on a summation of the values indicated in the first tDAI field and the second tDAI field. Similarly, if code block group-based HARQ is configured and the UL DCI message includes a third tDAI field indicating indicates a total number DCI messages scheduling transport blocks that are partitioned into code blocks and transmitted by first TRP 607 and a fourth tDAI field indicating a total number DCI messages scheduling transport blocks that are partitioned into code blocks and transmitted by second TRP 609, then UE 615 may determine a total size of the HARQ feedback message based on a summation of the values indicated in the first, second, third, and fourth tDAI fields.

In another example, the UL DCI message may indicate a total number of DCI messages transmitted from one of first TRP 607 and second TRP 609. For instance, if the UL DCI message includes a first tDAI field indicating a total number of DL DCI messages transmitted by one of first TRP 607, UE 615 may determine a total size of the HARQ feedback message by adding the value of the first tDAI field with a value included in a last DL DCI message received from second TRP 609. Similarly, if code block group-based HARQ is configured and the UL DCI message includes a second tDAI field indicating a total number of DCI messages scheduling transport blocks partitioned into code block groups and transmitted by first TRP 607, UE 615 may determine a total size of the HARQ feedback message by adding the value of the first tDAI field in the UL DCI message, the value of the second tDAI field in the UL DCI message, the value of a tDAI field in the last transport block-based DL DCI message received from second TRP 609, and the value of a tDAI field in the last code block group-based DL DCI message received from second TRP 609. In some cases, UE 615 determines which of first TRP 607 and second TRP 609 is associated with the first tDAI field based on receiving an RRC configuration indicating one of first TRP 607 and second TRP 609. In some cases, UE 615 determines which of first TRP 607 and second TRP 609 is associated with the first tDAI field based on determining that one of first TRP 607 and second TRP 609 failed to transmit any DCI messages requesting HARQ feedback during a certain time period.

In another example, if the UL DCI message includes a first tDAI field indicating a total number of DL DCI messages transmitted by first TRP 607 and second TRP 609, UE 615 may determine a total size of the HARQ feedback message based on the value indicated in the first tDAI field. Similarly, if code block group-based HARQ is configured and the UL DCI message includes a second tDAI field indicating a total number of DCI messages scheduling transport blocks partitioned into code block groups and transmitted by first TRP 607 and second TRP 609, UE 615 may determine a total size of the HARQ feedback message by adding the value of the first and second tDAI fields in the UL DCI message.

In some cases, UE 615 may process tDAI field in a received UL DCI message differently based on whether code block group-based HARQ is configured. For example, if code block group-based HARQ is not configured, UE 615 may determine that, in a received UL DCI message, a first tDAI field message indicates a total number of DCI messages transmitted from first TRP 607 and a second tDAI field in the indicates a total number of DCI messages transmitted from second TRP 609. Otherwise, if code block group-based HARQ is configured, UE 615 may determine that, in a received UL DCI message, a first tDAI field message indicates a total number of DCI messages transmitted from one of first TRP 607 and second TRP 609 and a second tDAI field message indicates a total number of DCI messages scheduling transport blocks partitioned into code block groups and transmitted from the one of first TRP 607 and second TRP 609. Alternatively, if code block group-based HARQ is configured, UE 615 may determine that, in a received UL DCI message, a first tDAI field message indicates a total number of DCI messages transmitted from first TRP 607 and second TRP 609 and a second tDAI field message indicates a total number of DCI messages scheduling transport blocks partitioned into code block groups and transmitted from first TRP 607 and second TRP 609.

After composing the HARQ feedback message based on the determined size, UE 615 may transmit the HARQ feedback to the network (e.g., a base station, first TRP 607, and/or second TRP 609) over PUSCH resources scheduled by the UL DCI message.

Figure 7:
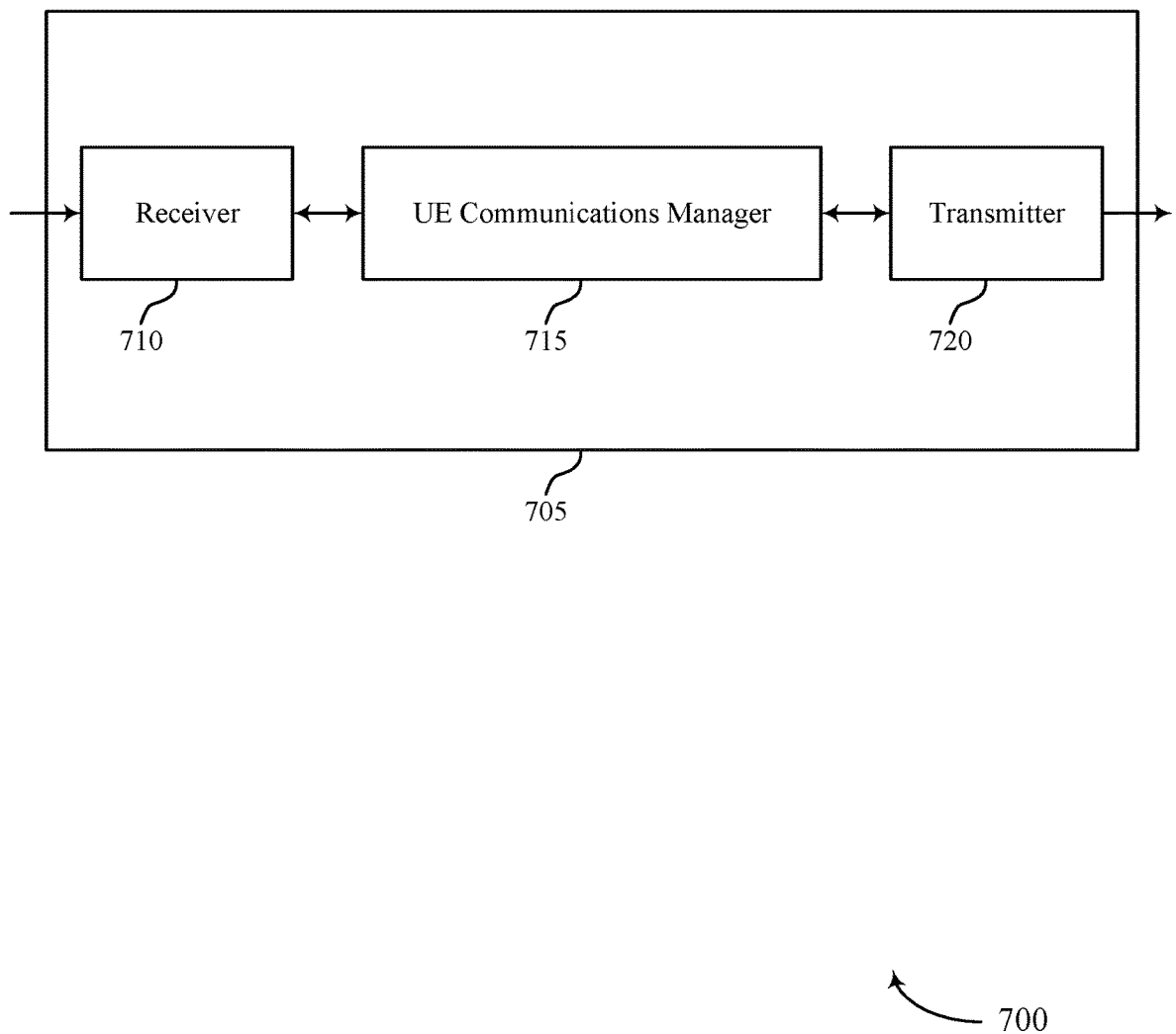
FIG. 7 shows a block diagram of a device that supports reporting joint HARQ feedback for multiple TRPs in accordance with aspects of the present disclosure.

FIG. 7 shows a block diagram 700 of a device 705 that supports reporting joint HARQ feedback for multiple TRPs in accordance with aspects of the present disclosure. The device 705 may be an example of aspects of a UE 115 as described herein. The device 705 may include a receiver 710, a UE communications manager 715, and a transmitter 720. The device 705 may also include a processor. Each of these components may be in communication with one another (e.g., via one or more buses).

The receiver 710 may receive information such as packets, user data, or control information associated with various information channels (e.g., control channels, data channels, and information related to reporting joint HARQ feedback for multiple TRPs, etc.). Information may be passed on to other components of the device 705. The receiver 710 may be included in a transceiver. The receiver 710 may utilize a single antenna or a set of antennas.

In some cases, cDAIs may be jointly assigned to DCI messages transmitted from multiple TRPs and HARQ feedback may be scheduled during PUCCH resources. The UE communications manager 715 may establish a set of connections between the UE and a set of transmission points using a set of component carriers, monitor a first set of downlink control information messages received using at least a first subset of the set of component carriers from a first transmission point of the set of transmission points, monitor a second set of downlink control information messages received using at least a second subset of the set of component carriers from a second transmission point of the set of transmission points, where the first set of downlink control information messages and the second set of downlink control information messages are received in a control channel monitoring occasion, and determine a set of indices associated with the first set of downlink control information messages and the second set of downlink control information messages based on the monitoring, where the set of indices has been jointly assigned to the first set of downlink control information messages and the second set of downlink control information messages.

In some cases, cDAIs may be separately assigned to DCI messages transmitted from multiple TRPs and HARQ feedback may be scheduled during PUSCH resources by an uplink DCI message. The UE communications manager 715 may also establish a set of connections between the UE and a set of transmission points using a set of component carriers, decode a scheduling grant that schedules data resources for an uplink transmission by the UE and requests that the UE transmit a hybrid automatic repeat request feedback message within the data resources, and determine a configuration of the hybrid automatic repeat request feedback message based on at least one field in the scheduling grant indicating one or both of a first total number of a first set of downlink control information messages transmitted by a first transmission point of the set of transmission points using at least a first subset of the set of component carriers during a time period that occurs before the data resources for the uplink transmission are scheduled and a second total number of a second set of downlink control information messages transmitted by a second transmission point of the set of transmission points using at least a second subset of the set of component carriers during the time period.

The UE communications manager 715, or its sub-components, may be implemented in hardware, code (e.g., software or firmware) executed by a processor, or any combination thereof. If implemented in code executed by a processor, the functions of the UE communications manager 715, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The UE communications manager 715, or its sub-components, may be physically located at various positions, including being distributed such that portions of functions are implemented at different physical locations by one or more physical components. In some examples, the UE communications manager 715, or its sub-components, may be a separate and distinct component in accordance with various aspects of the present disclosure. In some examples, the UE communications manager 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 720 may transmit signals generated by other components of the device 705. In some examples, the transmitter 720 may be collocated with a receiver 710 in a transceiver component. The transmitter 720 may utilize a single antenna or a set of antennas.

Figure 8:
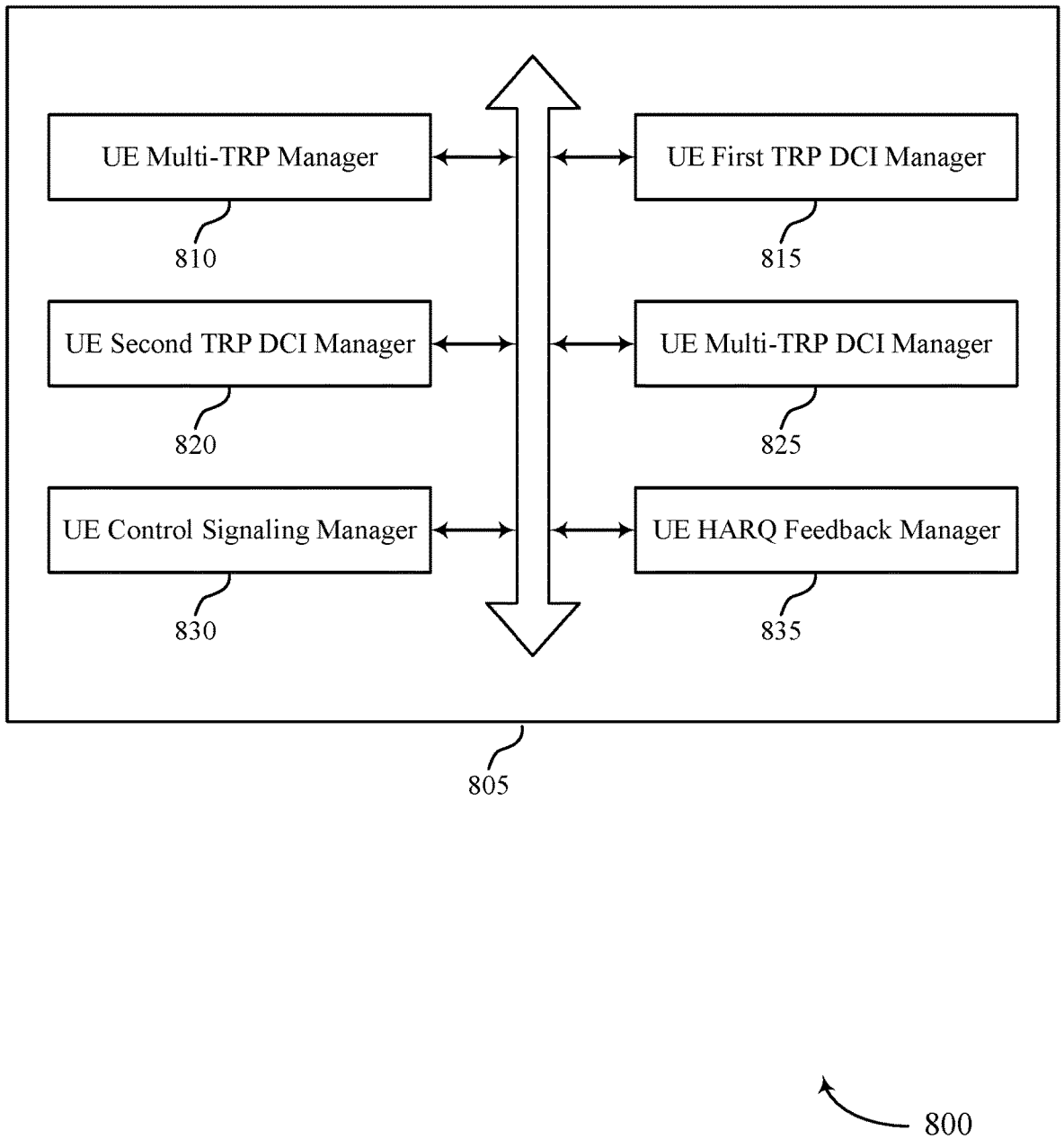
FIG. 8 shows a block diagram of a communications manager that supports reporting joint HARQ feedback for multiple TRPs in accordance with aspects of the present disclosure.

FIG. 8 shows a block diagram 800 of a UE communications manager 805 that supports reporting joint HARQ feedback for multiple TRPs in accordance with aspects of the present disclosure. The UE communications manager 805 may be an example of aspects of a UE communications manager 715 as described herein. The UE communications manager 805 may include a UE multi-TRP manager 810, a UE first TRP DCI manager 815, a UE second TRP DCI manager 820, a UE multi-TRP DCI manager 825, a UE control signaling manager 830, and a UE HARQ feedback manager 835. Each of these components may communicate, directly or indirectly, with one another (e.g., via one or more buses).

In some cases, cDAIs may be jointly assigned to DCI messages transmitted from multiple TRPs and HARQ feedback may be scheduled during PUCCH resources. The UE multi-TRP manager 810 may establish a set of connections between the UE and a set of transmission points using a set of component carriers.

The UE first TRP DCI manager 815 may monitor a first set of downlink control information messages received using at least a first subset of the set of component carriers from a first transmission point of the set of transmission points.

The UE second TRP DCI manager 820 may monitor a second set of downlink control information messages received using at least a second subset of the set of component carriers from a second transmission point of the set of transmission points, where the first set of downlink control information messages and the second set of downlink control information messages are received in a control channel monitoring occasion.

The UE multi-TRP DCI manager 825 may determine a set of indices associated with the first set of downlink control information messages and the second set of downlink control information messages based on the monitoring, where the set of indices has been jointly assigned to the first set of downlink control information messages and the second set of downlink control information messages. In some examples, the UE multi-TRP DCI manager 825 may determine that a downlink control information message of the first set of downlink control information messages or the second set of downlink control information messages was missed based on determining the set of indices. In some examples, the UE multi-TRP DCI manager 825 may arrange the first set of downlink control information messages and the second set of downlink control information messages in a sequential order based on whether the first mode or the second mode was indicated. The UE HARQ feedback manager 835 may construct a hybrid automatic repeat request feedback message based on the arranging.

In some examples, the UE multi-TRP DCI manager 825 may determine that the four consecutive downlink control information messages were missed based on receiving a second indication that the first mode was used to transmit the first set of downlink control information messages and the second set of downlink control information messages. In some examples, the UE multi-TRP DCI manager 825 may determine that four consecutive downlink control information messages were missed based on receiving a second indication that the second mode was used to transmit the first set of downlink control information messages and the second set of downlink control information messages.

The UE control signaling manager 830 may receive an indication that the set of indices was jointly assigned to the first set of downlink control information messages and the second set of downlink control information messages in accordance with either a first mode that initially assigns the set of indices across the set of transmission points for a given component carrier or a second mode that initially assigns the set of indices across the set of component carriers for a given transmission point. In some examples, the UE control signaling manager 830 may receive a radio resource control message including a configuration used to configure the UE to use one of the first mode or the second mode. In some examples, the UE control signaling manager 830 may receive a first radio resource control message including a first configuration used to configure the UE to establish connections with the set of transmission points; a second radio resource control message including a second configuration used to configure the UE to receive the first set of downlink control information messages from the first transmission point and the second set of downlink control information messages from the second transmission point; and a third radio resource control message including a third configuration used to configure the UE to generate a joint dynamic hybrid automatic feedback message for the first set of downlink control information messages and the second set of downlink control information messages.

In some cases, cDAIs may be separately assigned to DCI messages transmitted from multiple TRPs and HARQ feedback may be scheduled during PUSCH resources by an uplink DCI message. The UE multi-TRP manager 810 may establish a set of connections between the UE and a set of transmission points using a set of component carriers.

The UE multi-TRP DCI manager 825 may decode a scheduling grant that schedules data resources for an uplink transmission by the UE and requests that the UE transmit a hybrid automatic repeat request feedback message within the data resources.

In some examples, the UE multi-TRP DCI manager 825 may determine, from a first field of the at least one field, the first total number of the first set of downlink control information messages. In some examples, the UE multi-TRP DCI manager 825 may determine, from a second field of the at least one field, the second total number of the second set of downlink control information messages, where a size of the hybrid automatic repeat request feedback message is based on a first summation of the first total number of the first set of downlink control information messages and the second total number of the second set of downlink control information messages.

In some examples, the UE multi-TRP DCI manager 825 may determine, from a third field of the at least one field, a third total number of a third set of downlink control information messages associated with code block group based hybrid automatic repeat request feedback. In some examples, the UE multi-TRP DCI manager 825 may determine, from a fourth field of the at least one field, a fourth total number of a fourth set of downlink control information messages associated with code block group based hybrid automatic repeat request feedback, where the size of the hybrid automatic repeat request feedback message is based on a second summation of the first, second, third, and fourth total numbers.

In some examples, the UE multi-TRP DCI manager 825 may decode at least a portion of a third set of downlink control information messages received using at least a third subset of the set of component carriers from the second transmission point during the time period, where a last downlink control information message of the third set of downlink control information messages indicates a total number of the third set of downlink control information messages, where a size of the hybrid automatic repeat request feedback message is determined based on a summation of the first total number of the first set of downlink control information messages and the second total number of the second set of downlink control information messages.

In some examples, the UE multi-TRP DCI manager 825 may decode a fourth set of downlink control information messages received using at least a fourth subset of the set of component carriers from the first transmission point during the time period. In some examples, the UE multi-TRP DCI manager 825 may determine a fourth total number of the fourth set of downlink control information messages based on the decoding. In some examples, the UE multi-TRP DCI manager 825 may compare the fourth total number of the fourth set of downlink control information messages with the first total number of the first set of downlink control information messages. In some examples, the UE multi-TRP DCI manager 825 may identify a missed downlink control information message based on the comparing.

In some examples, the UE multi-TRP DCI manager 825 may determine that hybrid automatic repeat request feedback is not requested by any of the second set of downlink control information messages. In some examples, the UE multi-TRP DCI manager 825 may determine that a first field of the at least one field indicates the first total number of the first set of downlink control information messages based on determining that hybrid automatic repeat request feedback is not requested by any of the second set of downlink control information messages, where a size of the hybrid automatic repeat request feedback is determined based on the first total number of the first set of downlink control information messages.

The UE HARQ feedback manager 835 may determine a configuration of the hybrid automatic repeat request feedback message based on at least one field in the scheduling grant indicating one or both of a first total number of a first set of downlink control information messages transmitted by a first transmission point of the set of transmission points using at least a first subset of the set of component carriers during a time period that occurs before the data resources for the uplink transmission are scheduled and a second total number of a second set of downlink control information messages transmitted by a second transmission point of the set of transmission points using at least a second subset of the set of component carriers during the time period.

In some examples, the UE HARQ feedback manager 835 may determine, from a first field of the at least one field, a summation of the first total number of the first set of downlink control information messages and the second total number of the second set of downlink control information messages, where a size of the hybrid automatic repeat request feedback message is determined based on the summation.

In some examples, the UE HARQ feedback manager 835 may determine that code block group based hybrid automatic repeat request feedback is not configured for the UE. In some examples, selecting a format for receiving the scheduling grant that includes a first field of the at least one field indicating the first total number of the first set of downlink control information messages and a second field of the at least one field indicating the second total number of the second set of downlink control information messages based on determining that code block group based hybrid automatic repeat request feedback is not configured.

The UE control signaling manager 830 may receive a configuration to report hybrid automatic repeat request feedback for transport blocks and code block groups. In some examples, the UE control signaling manager 830 may receive a first radio resource control message including a first configuration used to configure the UE to establish connections with the set of transmission points; a second radio resource control message including a second configuration used to configure the UE to receive the first set of downlink control information messages from the first transmission point and the second set of downlink control information messages from the second transmission point; and a third radio resource control message including a third configuration used to configure the UE to generate a joint dynamic hybrid automatic feedback message for the first set of downlink control information messages and the second set of downlink control information messages.

Figure 9:
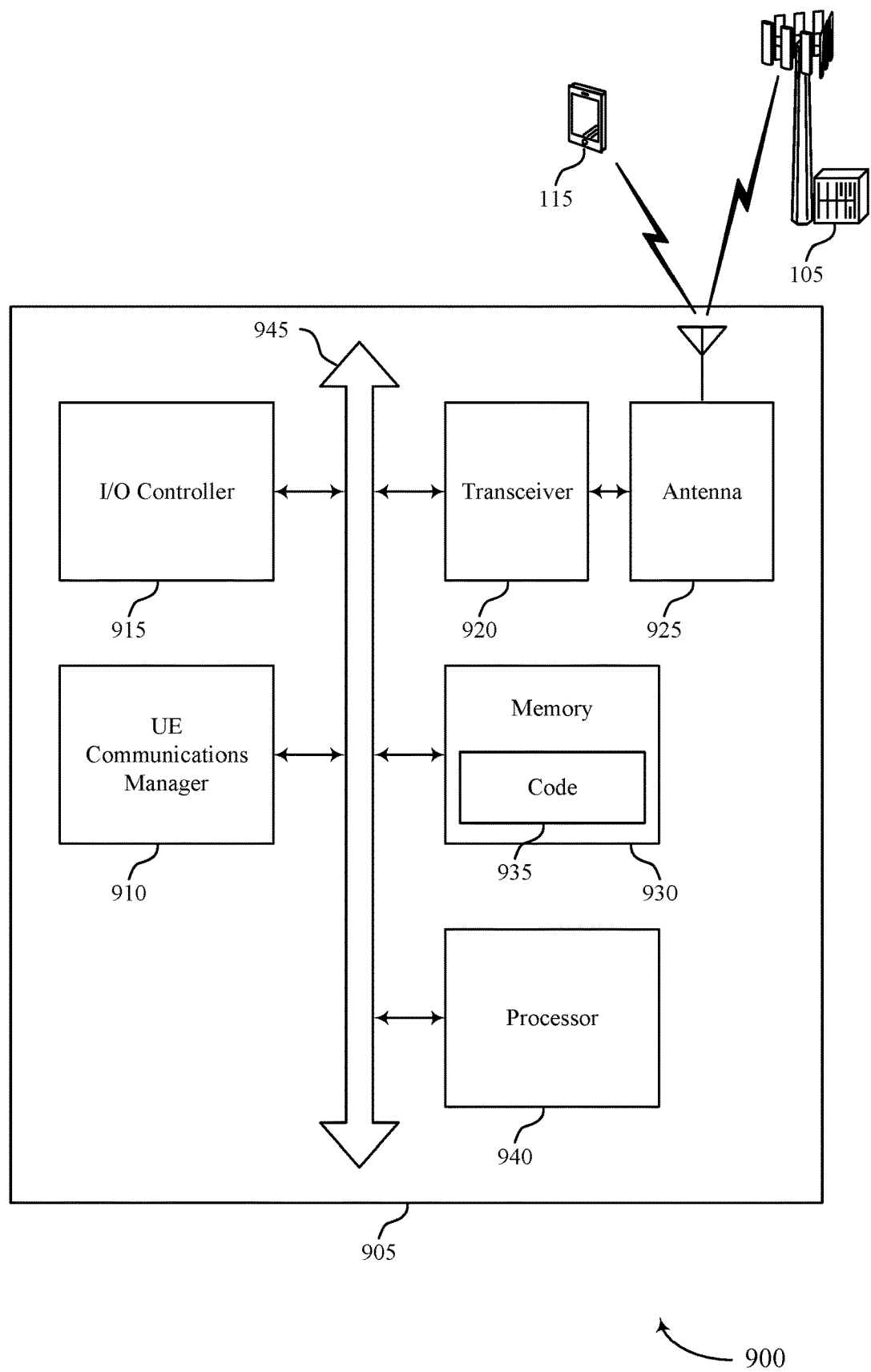
FIG. 9 shows a diagram of a system including a device that supports reporting joint HARQ feedback for multiple TRPs in accordance with aspects of the present disclosure.

FIG. 9 shows a diagram of a system 900 including a device 905 that supports reporting joint HARQ feedback for multiple TRPs in accordance with aspects of the present disclosure. The device 905 may be an example of or include the components of device 705 or a UE 115 as described herein. The device 905 may include components for bi-directional voice and data communications including components for transmitting and receiving communications, including a UE communications manager 910, an I/O controller 915, a transceiver 920, an antenna 925, memory 930, and a processor 940. These components may be in electronic communication via one or more buses (e.g., bus 945).

The UE communications manager 910 may be an example of UE communications manager 715 or UE communications manager 805 as described with reference to FIGS. 7 and 8.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include RAM and ROM. The memory 930 may store computer-readable, computer-executable code 935 including instructions that, when executed, cause the processor to perform various functions described herein. In some cases, the memory 930 may contain, among other things, a BIOS which may control basic hardware or software operation such as the interaction with peripheral components or devices.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting reporting joint HARQ feedback for multiple TRPs).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
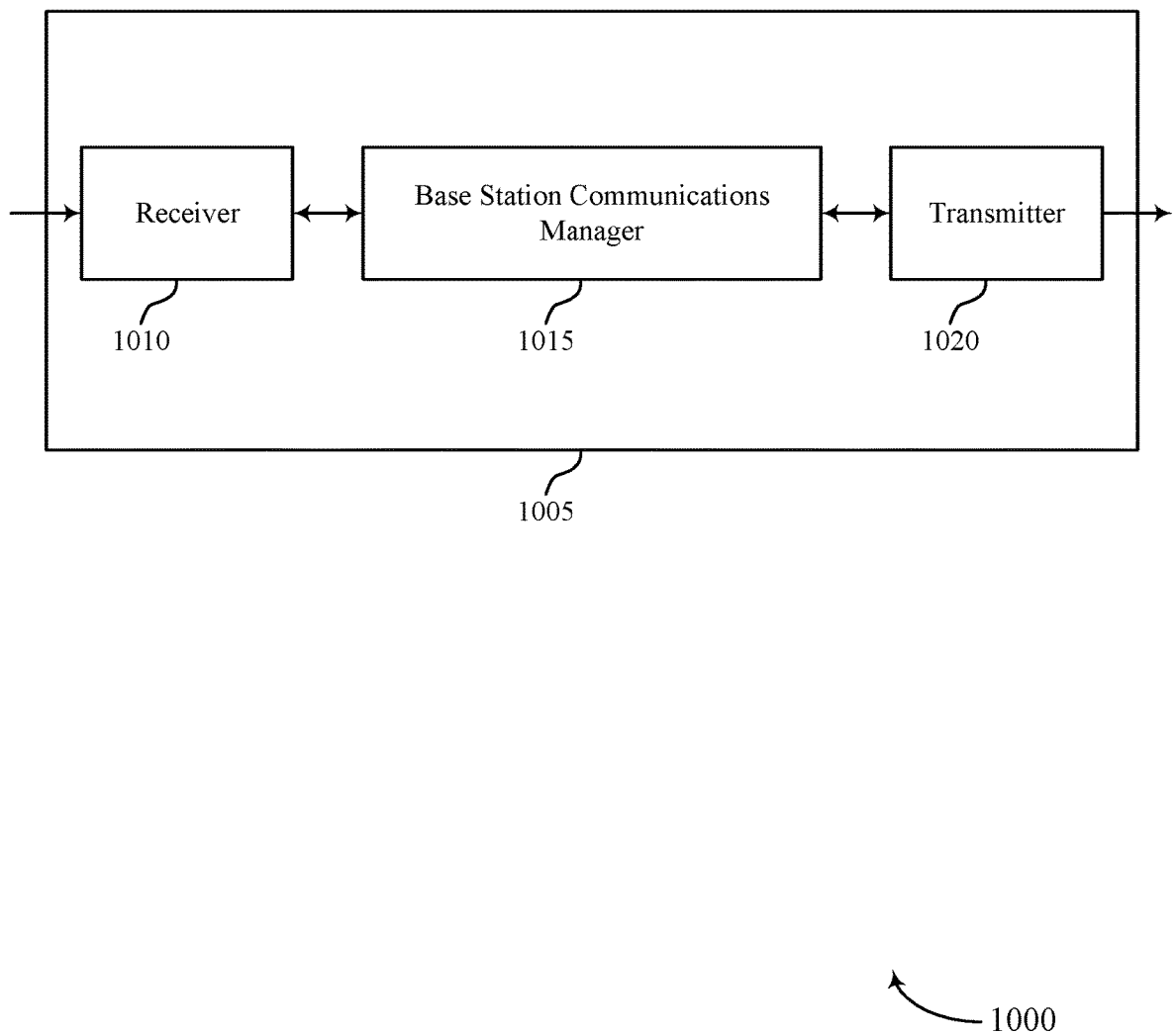
FIG. 10 shows a block diagrams of a device that supports reporting joint HARQ feedback for multiple TRPs in accordance with aspects of the present disclosure.

FIG. 10 shows a block diagram 1000 of a device 1005 that supports reporting joint HARQ feedback for multiple TRPs in accordance with aspects of the present disclosure. The device 1005 may be an example of aspects of a base station 105 as described herein. The device 1005 may include a receiver 1010, a base station communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to reporting joint HARQ feedback for multiple TRPs, etc.). Information may be passed on to other components of the device 1005. The receiver 1010 may be included in a transceiver. The receiver 1010 may utilize a single antenna or a set of antennas.

In some cases, cDAIs may be jointly assigned to DCI messages transmitted from multiple TRPs and HARQ feedback may be scheduled during PUCCH resources. The base station communications manager 1015 may configure a UE with a plurality of component carriers, generate a first set of downlink control information messages for transmission to the UE using at least a first subset of the set of component carriers from a first transmission point of the set of transmission points, generate a second set of downlink control information messages for transmission to the UE using at least a first second of the set of component carriers from a second transmission point of the set of transmission points, where the first set of downlink control information messages and the second set of downlink control information messages are scheduled to be transmitted during a control channel monitoring occasion, and assign a set of indices to the first set of downlink control information messages and the second set of downlink control information messages based on the generating, where the set of indices is jointly assigned to the first set of downlink control information messages and the second set of downlink control information messages.

In some cases, cDAIs may be separately assigned to DCI messages transmitted from multiple TRPs and HARQ feedback may be scheduled during PUSCH resources by an uplink DCI message. The base station communications manager 1015 may also establish a set of connections between a UE and a set of transmission points using a set of component carriers, generate a scheduling grant that schedules data resources for an uplink transmission by the UE and requests that the UE transmit a hybrid automatic repeat request feedback message within the data resources, and program, in the scheduling grant, at least one field that indicates a size of the hybrid automatic repeat request feedback message based on one or both of a first total number of a first set of downlink control information messages that schedule downlink transmissions transmitted by a first transmission point of the set of transmission points using at least a first subset of the set of component carriers during a time period that occurs before the data resources for the uplink transmission are scheduled and a second total number of a second set of downlink control information messages that schedule downlink transmissions transmitted by a second transmission point of the set of transmission points using at least a second subset of the set of component carriers during the time period.

The base station communications manager 1015, or its sub-components, may be implemented in hardware, code (e.g., software or firmware) executed by a processor, or any combination thereof. If implemented in code executed by a processor, the functions of the base station communications manager 1015, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The base station communications manager 1015, or its sub-components, may be physically located at various positions, including being distributed such that portions of functions are implemented at different physical locations by one or more physical components. In some examples, the base station communications manager 1015, or its sub-components, may be a separate and distinct component in accordance with various aspects of the present disclosure. In some examples, the base station communications manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver component. The transmitter 1020 may utilize a single antenna or a set of antennas.

Figure 11:
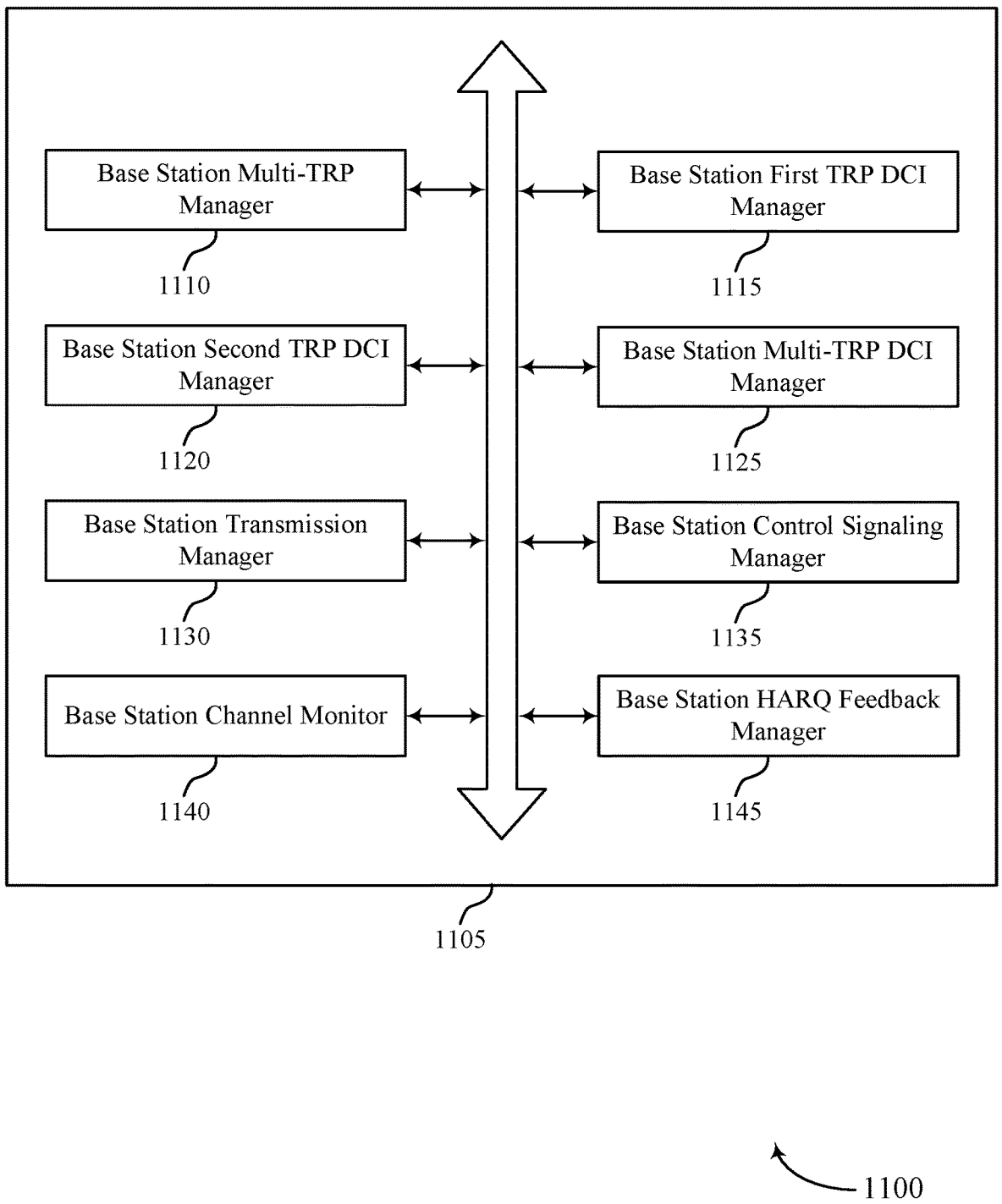
FIG. 11 shows a block diagram of a communications manager that supports reporting joint HARQ feedback for multiple TRPs in accordance with aspects of the present disclosure.

FIG. 11 shows a block diagram 1100 of a base station communications manager 1105 that supports reporting joint HARQ feedback for multiple TRPs in accordance with aspects of the present disclosure. The base station communications manager 1105 may be an example of aspects of a base station communications manager 1015 described herein. The base station communications manager 1105 may include a base station multi-TRP manager 1110, a base station first TRP DCI manager 1115, a base station second TRP DCI manager 1120, a base station multi-TRP DCI manager 1125, a base station transmission manager 1130, a base station control signaling manager 1135, a base station channel monitor 1140. Each of these components may communicate, directly or indirectly, with one another (e.g., via one or more buses).

In some cases, cDAIs may be jointly assigned to DCI messages transmitted from multiple TRPs and HARQ feedback may be scheduled during PUCCH resources. The base station multi-TRP manager 1110 may establish a set of connections between a UE and a set of transmission points using a set of component carriers. In some examples, the base station multi-TRP manager 1110 may assign a first index to a first subset of the set of control resource sets and a second index to a second subset of the set of control resource sets. In some examples, the base station multi-TRP DCI manager 1125 may configure the UE to receive control information over a set of control resource sets. In some cases, the first transmission point is associated with the first index and the first subset of the set of control resource sets and the second transmission point is associated with the second index and the second subset of the set of control resource sets.

The base station first TRP DCI manager 1115 may generate a first set of downlink control information messages for transmission to the UE using at least a first subset of the set of component carriers from a first transmission point of the set of transmission points. In some examples, the base station first TRP DCI manager 1115 may generate a third set of downlink control information messages for transmission to the UE using at least a third subset of the set of component carriers from the first transmission point.

The base station second TRP DCI manager 1120 may generate a second set of downlink control information messages for transmission to the UE using at least a first second of the set of component carriers from a second transmission point of the set of transmission points, where the first set of downlink control information messages and the second set of downlink control information messages are scheduled to be transmitted during a control channel monitoring occasion. In some examples, the base station second TRP DCI manager 1120 may generate a fourth set of downlink control information messages for transmission to the UE using a least a fourth subset of the set of component carriers from the second transmission point, where the first set of downlink control information messages and the second set of downlink control information messages are scheduled to be transmitted during a second control channel monitoring occasion.

The base station multi-TRP DCI manager 1125 may assign a set of indices to the first set of downlink control information messages and the second set of downlink control information messages based on the generating, where the set of indices is jointly assigned to the first set of downlink control information messages and the second set of downlink control information messages. In some examples, the base station multi-TRP DCI manager 1125 may sequentially assign a first set of the set of indices to first downlink control information messages of the first set of downlink control information messages and the second set of downlink control information messages that are within a first component carrier. In some examples, the base station multi-TRP DCI manager 1125 may sequentially assign a second set of the set of indices to second downlink control information messages of the first set of downlink control information messages and the second set of downlink control information messages that are within a second component carrier after sequentially assigning the first set of the set of indices, where a last index of the first set is in sequence with a first index of the second set. In some examples, the base station multi-TRP DCI manager 1125 may assign the set of indices to the third set of downlink control information messages and the fourth set of downlink control information messages, where the set of indices is jointly assigned to the first, second, third, and fourth set of downlink control information messages.

In some examples, the base station multi-TRP DCI manager 1125 may assign a first index of the set of indices to a first downlink control information message of the first set of downlink control information messages that is scheduled to be transmitted using the first component carrier. In some examples, the base station multi-TRP DCI manager 1125 may assign a second index of the set of indices to a first downlink control information message of the second set of downlink control information messages that is scheduled to be transmitted using the first component carrier. In some examples, the base station multi-TRP DCI manager 1125 may sequentially assign a first set of the set of indices to the first set of downlink control information messages. In some examples, the base station multi-TRP DCI manager 1125 may sequentially assign a second set of the set of indices to the second set of downlink control information messages, where a last index of the first set is in sequence with a first index of the second set.

In some examples, the base station multi-TRP DCI manager 1125 may assign a first index of the set of indices to a first downlink control information message of the first set of downlink control information messages that is scheduled to be transmitted using a first component carrier of the set of component carriers. In some examples, the base station multi-TRP DCI manager 1125 may assign a second index of the set of indices to a second downlink control information message of the first set of downlink control information messages that is scheduled to be transmitted using a second component carrier of the set of component carriers. In some examples, the base station multi-TRP DCI manager 1125 may assign a third index of the set of indices to a first downlink control information message of the second set of downlink control information messages that is scheduled to be transmitted using the first component carrier. In some examples, the base station multi-TRP DCI manager 1125 may assign a third index of the set of indices to a second downlink control information message of the first set of downlink control information messages that is scheduled to be transmitted using the second component carrier. In some examples, the base station multi-TRP DCI manager 1125 may assign a fourth index of the set of indices to a second downlink control information message of the second set of downlink control information messages that is scheduled to be transmitted using the second component carrier. In some examples, the base station multi-TRP DCI manager 1125 may program, in each of the first set of downlink control information messages and the second set of downlink control information messages, a field that indicates an order of a downlink control information message based on the assigning, where the field includes two bits.

In some examples, the base station multi-TRP DCI manager 1125 may select a mode from a set of modes for assigning the set of indices to the first set of downlink control information messages and the second set of downlink control information messages.

In some examples, the base station multi-TRP DCI manager 1125 may compute a summation of a first total number of the first set of downlink control information messages and a second total number of the second set of downlink control information messages. In some examples, the base station multi-TRP DCI manager 1125 may program, in each of the first set of downlink control information messages and the second set of downlink control information messages, a field that indicates the summation based on the computing, where the field includes two bits.

The base station transmission manager 1130 may transmit the first set of downlink control information messages and the second set of downlink control information messages during the control channel monitoring occasion. In some examples, the base station transmission manager 1130 may transmit the first set of downlink control information messages over the first subset of the set of control resource sets and the second set of downlink control information messages over the second subset of the set of control resource sets. In some examples, the base station transmission manager 1130 may transmit the third set of downlink control information messages and the fourth set of downlink control information messages during the second control channel monitoring occasion.

The base station control signaling manager 1135 may transmit, to the UE, a radio resource control message including a configuration used to configure the UE to use the mode of the plurality of modes based on the selecting. In some examples, the base station control signaling manager 1135 may transmit, to the UE, a first radio resource control message including a first configuration used to configure the UE to establish connections with the set of transmission points; a second radio resource control message including a second configuration used to configure the UE to receive the first set of downlink control information messages from the first transmission point and the second set of downlink control information messages from the second transmission point; and a third radio resource control message including a third configuration used to configure the UE to generate a joint dynamic hybrid automatic feedback message for the first set of downlink control information messages and the second set of downlink control information messages.

The base station channel monitor 1140 may detect a first level of interference in a transmission path between the first transmission point and the UE, where the mode of the set of modes that initially assigns the set of indices across the set of transmission points for a given component carrier is selected based on the detecting. In some examples, the base station channel monitor 1140 may detect a first level of interference in a first component carrier and a second component carrier of the set of component carriers, where the mode of the set of modes that initially assigns the set of indices across the set of component carriers for a given transmission point is selected based on the detecting.

In some cases, cDAIs may be separately assigned to DCI messages transmitted from multiple TRPs and HARQ feedback may be scheduled during PUSCH resources by an uplink DCI message. The base station multi-TRP manager 1110 may establish a set of connections between a UE and a set of transmission points using a set of component carriers.

The base station multi-TRP DCI manager 1125 may generate a scheduling grant that schedules data resources for an uplink transmission by the UE and requests that the UE transmit a hybrid automatic repeat request feedback message within the data resources.

In some examples, the base station multi-TRP DCI manager 1125 may program, in the scheduling grant, at least one field that indicates a size of the hybrid automatic repeat request feedback message based on one or both of a first total number of a first set of downlink control information messages that schedule downlink transmissions transmitted by a first transmission point of the set of transmission points using at least a first subset of the set of component carriers during a time period that occurs before the data resources for the uplink transmission are scheduled and a second total number of a second set of downlink control information messages that schedule downlink transmissions transmitted by a second transmission point of the set of transmission points using at least a second subset of the set of component carriers during the time period.

In some examples, the base station multi-TRP DCI manager 1125 may program, in the scheduling grant, a second field of the at least one field based on the second total number of the second set of downlink control information messages. In some examples, the base station multi-TRP DCI manager 1125 may program, in the scheduling grant, a third field of the at least one field based on a third total number of a third set of downlink control information messages that schedule downlink transmissions transmitted by the first transmission point using at least a third subset of the set of component carriers, the third set of downlink control information messages being associated with code block group based hybrid automatic repeat request feedback. In some examples, the base station multi-TRP DCI manager 1125 may program, in the scheduling grant, a fourth field of the at least one field based on a fourth total number of a fourth set of downlink control information messages that schedule downlink transmissions transmitted by the second transmission point using at least a fourth subset of the set of component carriers, the fourth set of downlink control information messages being associated with code block group based hybrid automatic repeat request feedback.

In some cases, a first field of the at least one field is programmed solely based on either the first total number of the first set of downlink control information messages or the second total number of the second set of downlink control information messages. In some cases, a first field of the at least one field is programmed based on a summation of the first total number and the second total number.

In some examples, the base station multi-TRP DCI manager 1125 may compute the first total number of the first set of downlink control information messages or the second total number of the second set of downlink control information messages, or both. In some examples, the base station multi-TRP DCI manager 1125 may compute the third total number of the third set of downlink control information messages and the fourth total number of the fourth set of downlink control information messages.

In some examples, the base station multi-TRP DCI manager 1125 may determine that hybrid automatic repeat request feedback is not requested by any of the second set of downlink control information messages, where a first field of the at least one field is programmed solely based on the first total number of the first set of downlink control information messages based on the determining. In some examples, selecting a format for transmitting the scheduling grant that includes a first field of the at least one field indicating the first total number of the first set of downlink control information messages and a second field of the at least one field indicating the second total number of the second set of downlink control information messages based on the determining. In some examples, the base station multi-TRP DCI manager 1125 may assign a set of indices to the first set of downlink control information messages and the second set of downlink control information messages, where the set of indices is separately assigned to the first set of downlink control information messages and the second set of downlink control information messages.

The base station transmission manager 1130 may transmit the first set of downlink control information messages, the second set of downlink control information messages, and the scheduling grant.

The Base station HARQ feedback manager 1145 may configure the UE to report hybrid automatic repeat request feedback for transport blocks and code block groups. In some examples, the Base station HARQ feedback manager 1145 may determine that code block group based hybrid automatic repeat request feedback is not configured for the UE.

The base station control signaling manager 1135 may transmit, to the UE, a first radio resource control message including a first configuration used to configure the UE to establish connections with the set of transmission points; a second radio resource control message including a second configuration used to configure the UE to receive the first set of downlink control information messages from the first transmission point and the second set of downlink control information messages from the second transmission point; and a third radio resource control message including a third configuration used to configure the UE to generate a joint dynamic hybrid automatic feedback message for the first set of downlink control information messages and the second set of downlink control information messages.

Figure 12:
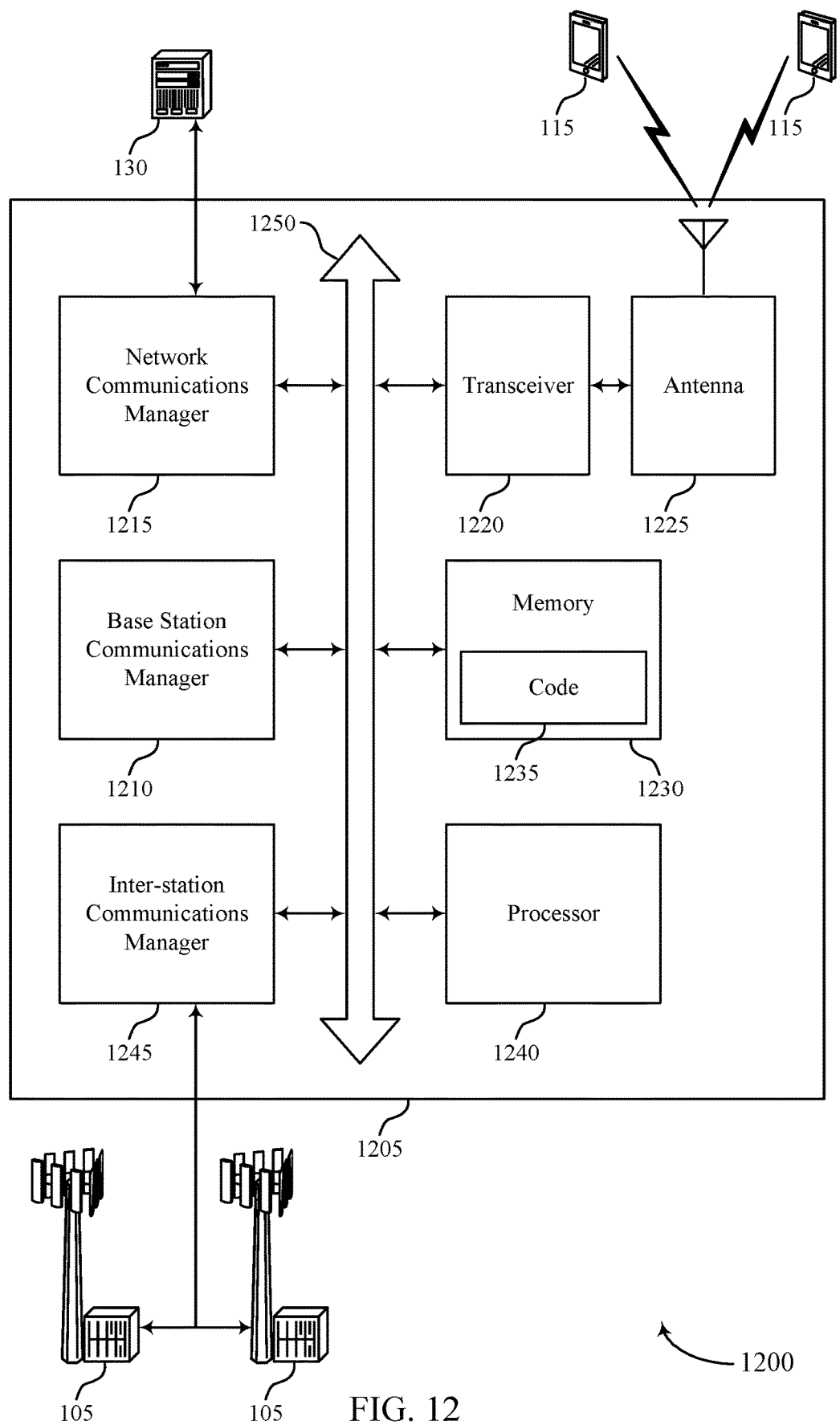
FIG. 12 shows a diagram of a system including a device that supports reporting joint HARQ feedback for multiple TRPs in accordance with aspects of the present disclosure.

FIG. 12 shows a diagram of a system 1200 including a device 1205 that supports reporting joint HARQ feedback for multiple TRPs in accordance with aspects of the present disclosure. The device 1205 may be an example of or include the components of device 1005 or a base station 105 as described herein. The device 1205 may include components for bi-directional voice and data communications including components for transmitting and receiving communications, including a base station communications manager 1210, a network communications manager 1215, a transceiver 1220, an antenna 1225, memory 1230, a processor 1240, and an inter-station communications manager 1245. These components may be in electronic communication via one or more buses (e.g., bus 1250).

The base station communications manager 1210 may be an example of base station communications manager 1015 or base station communications manager 1105 as described with reference to FIGS. 10 and 11.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device 1205 to perform various functions (e.g., functions or tasks supporting reporting joint HARQ feedback for multiple TRPs).

The inter-station communications manager 1245 may manage communications with other base station 105 and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
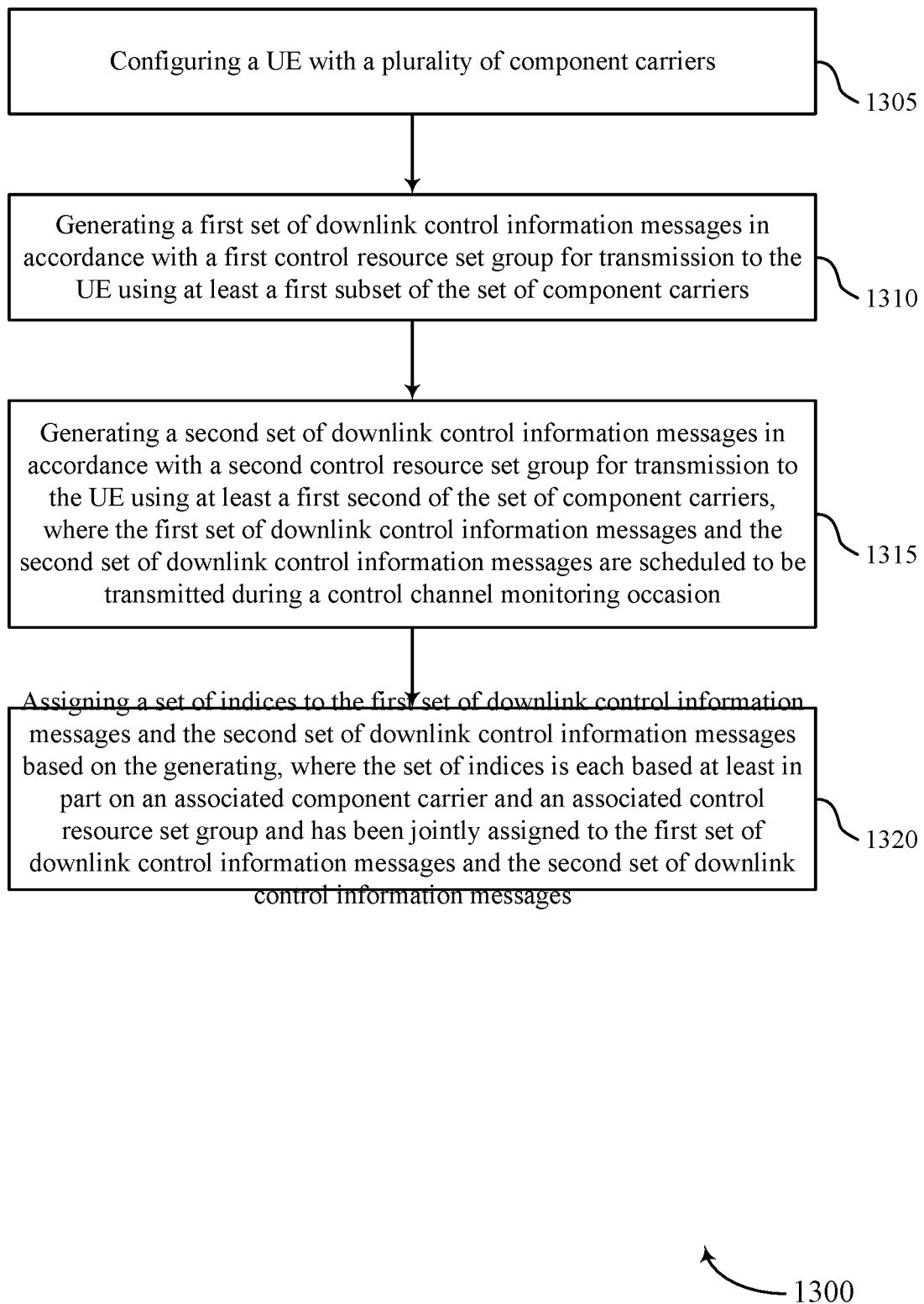
FIGS. 13 through 16 show flowcharts illustrating methods that support reporting joint HARQ feedback for multiple TRPs in accordance with aspects of the present disclosure.

FIG. 13 shows a flowchart illustrating a method 1300 that supports reporting joint HARQ feedback for multiple TRPs in accordance with aspects of the present disclosure. The operations of method 1300 may be implemented by a base station 105 or its components as described herein. For example, the operations of method 1300 may be performed by a base station communications manager as described with reference to FIGS. 10 through 12. In some examples, a base station may execute a set of instructions to control the functional elements of the base station to perform the functions described below. Additionally, or alternatively, a base station may perform aspects of the functions described below using special-purpose hardware.

At 1305, the base station may configure a UE with a plurality of component carriers. The operations of 1305 may be performed according to the methods described herein. In some examples, aspects of the operations of 1305 may be performed by a base station multi-TRP manager as described with reference to FIGS. 10 through 12.

At 1310, the base station may generate a first set of downlink control information messages in accordance with a first control resource set group for transmission to the UE using at least a first subset of the set of component carriers. The operations of 1310 may be performed according to the methods described herein. In some examples, aspects of the operations of 1310 may be performed by a base station first TRP DCI manager as described with reference to FIGS. 10 through 12.

At 1315, the base station may generate a second set of downlink control information messages in accordance with a second control resource set group for transmission to the UE using at least a first second of the set of component carriers, where the first set of downlink control information messages and the second set of downlink control information messages are scheduled to be transmitted during a control channel monitoring occasion. The operations of 1315 may be performed according to the methods described herein. In some examples, aspects of the operations of 1315 may be performed by a base station second TRP DCI manager as described with reference to FIGS. 10 through 12.

At 1320, the base station may assign a set of indices to the first set of downlink control information messages and the second set of downlink control information messages based on the generating, where the set of indices is each based at least in part on an associated component carrier and an associated control resource set and has been jointly assigned to the first set of downlink control information messages and the second set of downlink control information messages. The operations of 1320 may be performed according to the methods described herein. In some examples, aspects of the operations of 1320 may be performed by a base station multi-TRP DCI manager as described with reference to FIGS. 10 through 12.

Figure 14:
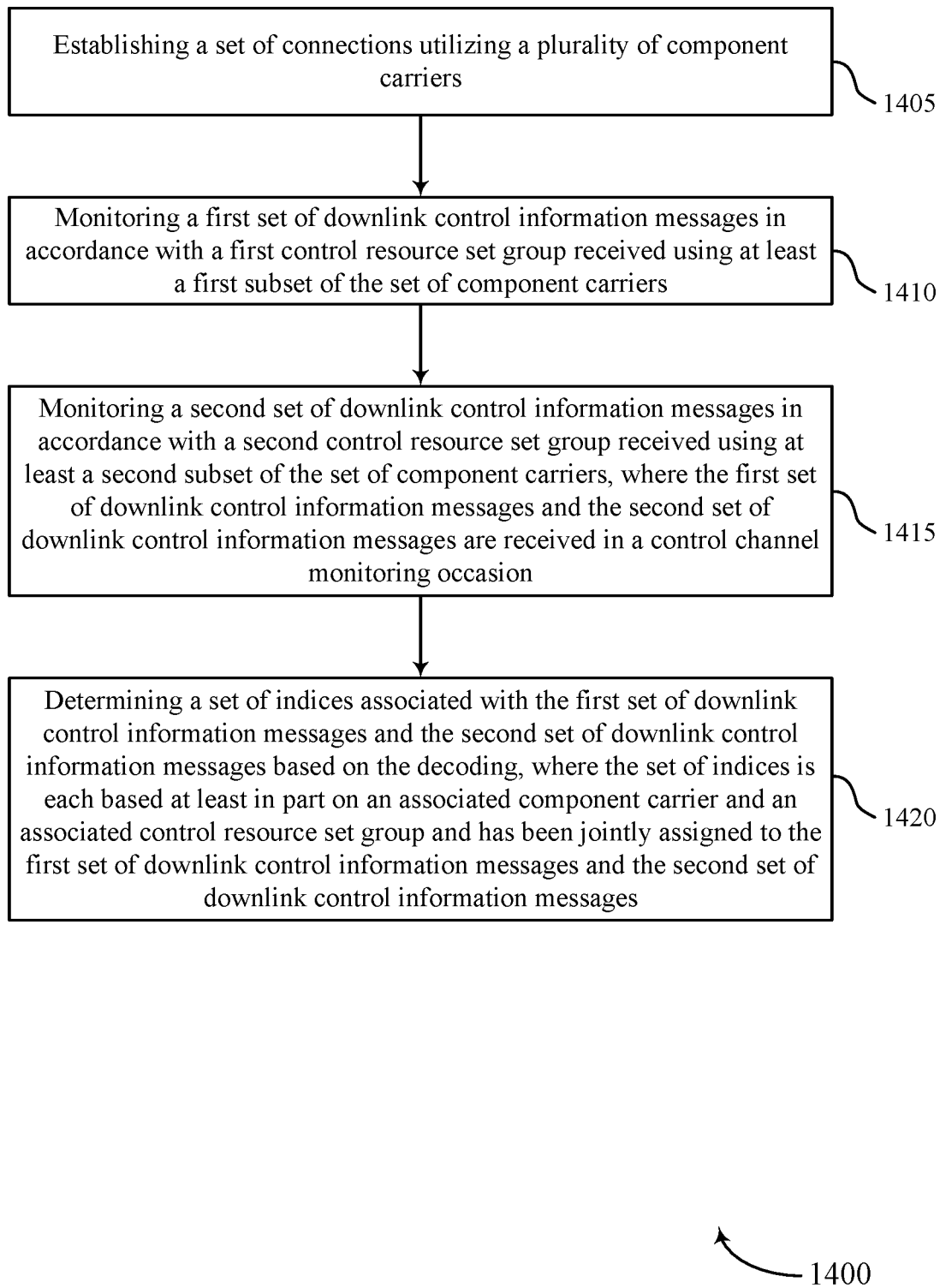

FIG. 14 shows a flowchart illustrating a method 1400 that supports reporting joint HARQ feedback for multiple TRPs in accordance with aspects of the present disclosure. The operations of method 1400 may be implemented by a UE 115 or its components as described herein. For example, the operations of method 1400 may be performed by a UE communications manager as described with reference to FIGS. 7 through 9. In some examples, a UE may execute a set of instructions to control the functional elements of the UE to perform the functions described below. Additionally, or alternatively, a UE may perform aspects of the functions described below using special-purpose hardware.

At 1405, the UE may establish a set of connections utilizing a plurality of component carriers. The operations of 1405 may be performed according to the methods described herein. In some examples, aspects of the operations of 1405 may be performed by a UE multi-TRP manager as described with reference to FIGS. 7 through 9.

At 1410, the UE may monitor a first set of downlink control information messages in accordance with a first control resource set group received using at least a first subset of the set of component carriers. The operations of 1410 may be performed according to the methods described herein. In some examples, aspects of the operations of 1410 may be performed by a UE first TRP DCI manager as described with reference to FIGS. 7 through 9.

At 1415, the UE may monitor a second set of downlink control information messages in accordance with a second control resource set group received using at least a second subset of the set of component carriers, where the first set of downlink control information messages and the second set of downlink control information messages are received in a control channel monitoring occasion. The operations of 1415 may be performed according to the methods described herein. In some examples, aspects of the operations of 1415 may be performed by a UE second TRP DCI manager as described with reference to FIGS. 7 through 9.

At 1420, the UE may determine a set of indices associated with the first set of downlink control information messages and the second set of downlink control information messages based on the monitoring, where the set of indices is each based at least in part on an associated component carrier and an associated control resource set and has been jointly assigned to the first set of downlink control information messages and the second set of downlink control information messages. The operations of 1420 may be performed according to the methods described herein. In some examples, aspects of the operations of 1420 may be performed by a UE multi-TRP DCI manager as described with reference to FIGS. 7 through 9.

Figure 15:
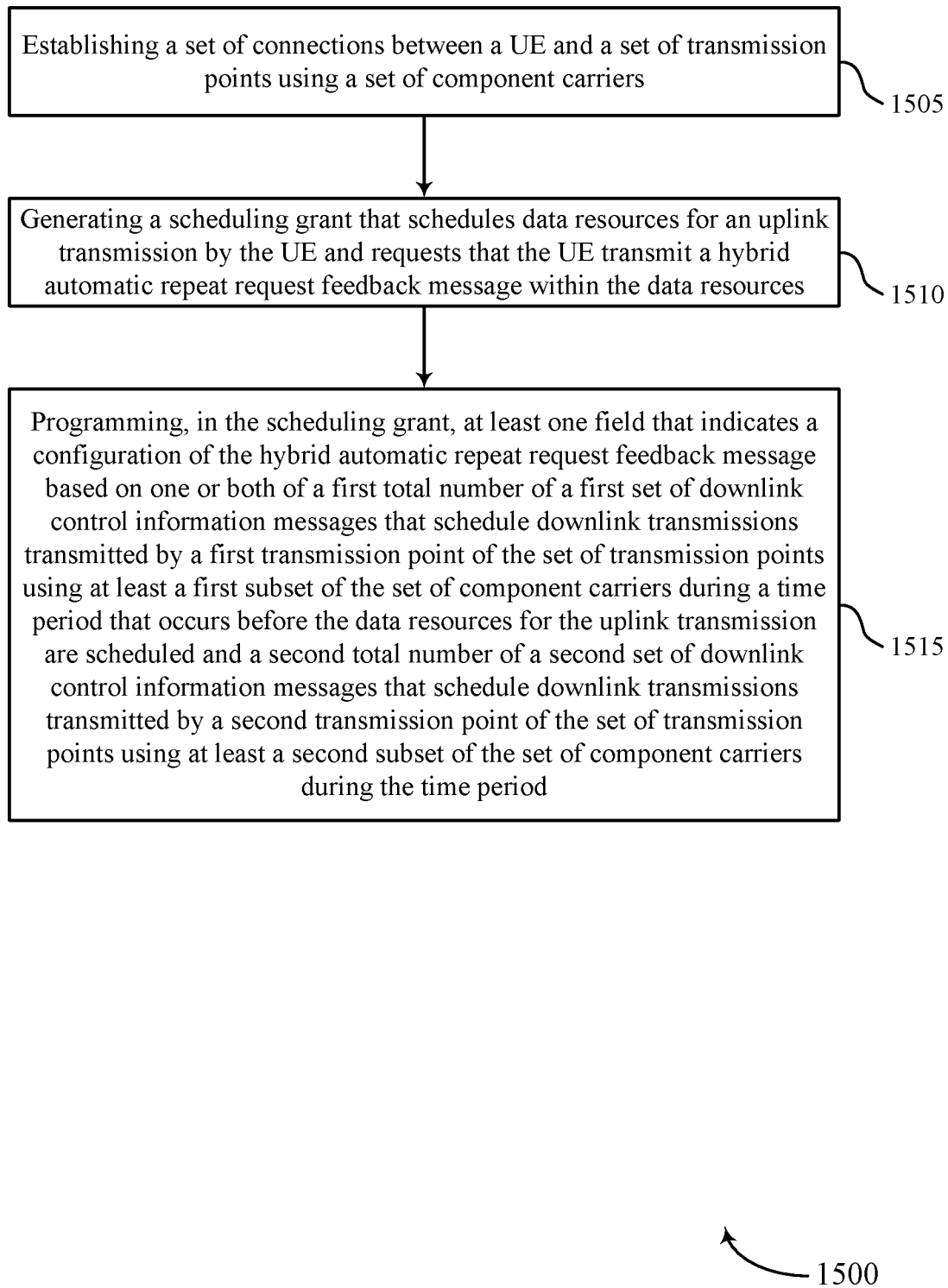

FIG. 15 shows a flowchart illustrating a method 1500 that supports reporting joint HARQ feedback for multiple TRPs in accordance with aspects of the present disclosure. The operations of method 1500 may be implemented by a base station 105 or its components as described herein. For example, the operations of method 1500 may be performed by a base station communications manager as described with reference to FIGS. 10 through 12. In some examples, a base station may execute a set of instructions to control the functional elements of the base station to perform the functions described below. Additionally, or alternatively, a base station may perform aspects of the functions described below using special-purpose hardware.

At 1505, the base station may establish a set of connections between a UE and a set of transmission points using a set of component carriers. The operations of 1505 may be performed according to the methods described herein. In some examples, aspects of the operations of 1505 may be performed by a base station multi-TRP manager as described with reference to FIGS. 10 through 12.

At 1510, the base station may generate a scheduling grant that schedules data resources for an uplink transmission by the UE and requests that the UE transmit a hybrid automatic repeat request feedback message within the data resources. The operations of 1510 may be performed according to the methods described herein. In some examples, aspects of the operations of 1510 may be performed by a base station multi-TRP DCI manager as described with reference to FIGS. 10 through 12.

At 1515, the base station may program, in the scheduling grant, at least one field that indicates a size of the hybrid automatic repeat request feedback message based on one or both of a first total number of a first set of downlink control information messages that schedule downlink transmissions transmitted by a first transmission point of the set of transmission points using at least a first subset of the set of component carriers during a time period that occurs before the data resources for the uplink transmission are scheduled and a second total number of a second set of downlink control information messages that schedule downlink transmissions transmitted by a second transmission point of the set of transmission points using at least a second subset of the set of component carriers during the time period. The operations of 1515 may be performed according to the methods described herein. In some examples, aspects of the operations of 1515 may be performed by a base station multi-TRP DCI manager as described with reference to FIGS. 10 through 12.

Figure 16:
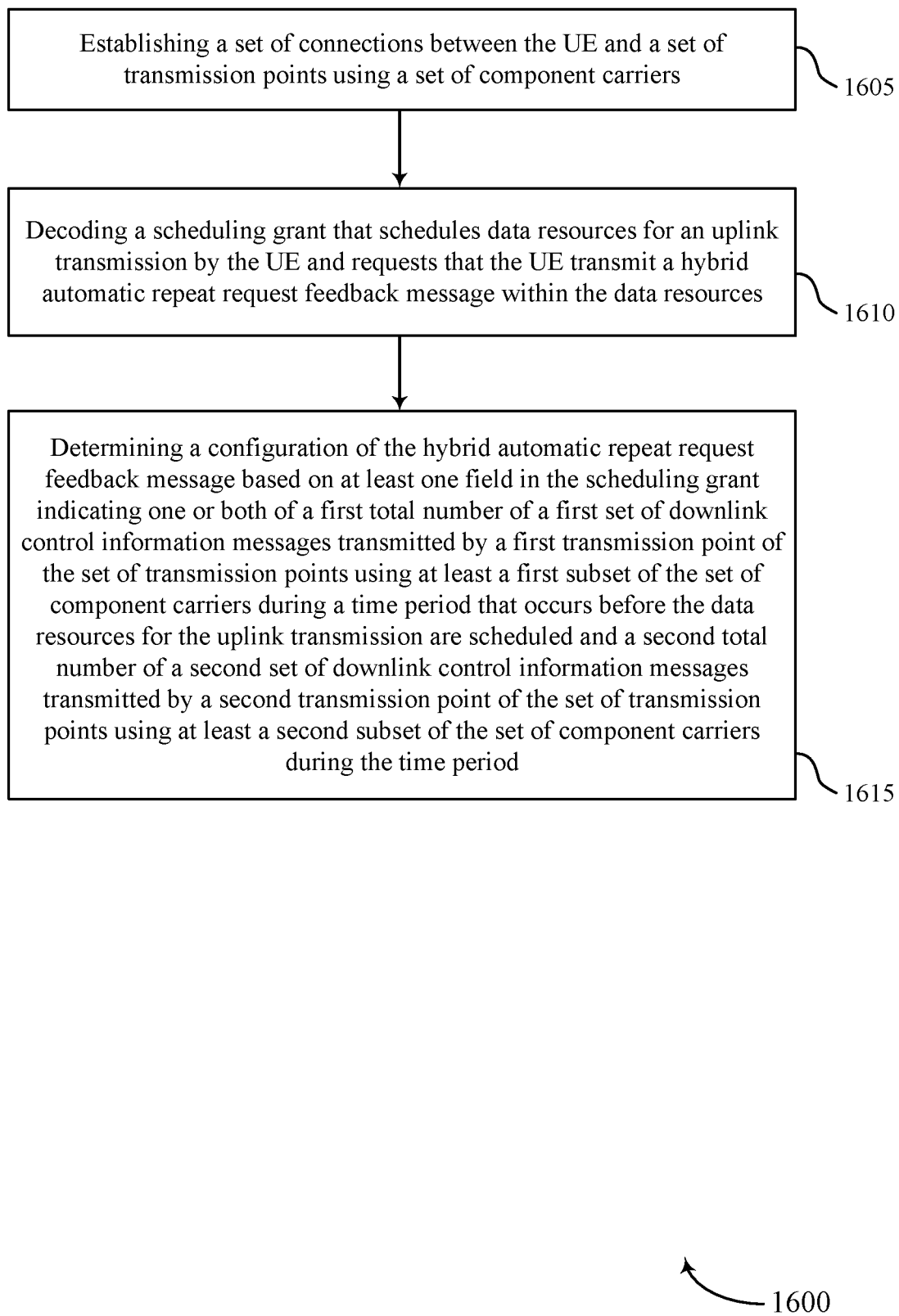

FIG. 16 shows a flowchart illustrating a method 1600 that supports reporting joint HARQ feedback for multiple TRPs in accordance with aspects of the present disclosure. The operations of method 1600 may be implemented by a UE 115 or its components as described herein. For example, the operations of method 1600 may be performed by a UE communications manager as described with reference to FIGS. 7 through 9. In some examples, a UE may execute a set of instructions to control the functional elements of the UE to perform the functions described below. Additionally, or alternatively, a UE may perform aspects of the functions described below using special-purpose hardware.

At 1605, the UE may establish a set of connections between the UE and a set of transmission points using a set of component carriers. The operations of 1605 may be performed according to the methods described herein. In some examples, aspects of the operations of 1605 may be performed by a UE multi-TRP manager as described with reference to FIGS. 7 through 9.

At 1610, the UE may decode a scheduling grant that schedules data resources for an uplink transmission by the UE and requests that the UE transmit a hybrid automatic repeat request feedback message within the data resources. The operations of 1610 may be performed according to the methods described herein. In some examples, aspects of the operations of 1610 may be performed by a base station multi-TRP DCI manager as described with reference to FIGS. 7 through 9.

At 1615, the UE may determine a configuration of the hybrid automatic repeat request feedback message based on at least one field in the scheduling grant indicating one or both of a first total number of a first set of downlink control information messages transmitted by a first transmission point of the set of transmission points using at least a first subset of the set of component carriers during a time period that occurs before the data resources for the uplink transmission are scheduled and a second total number of a second set of downlink control information messages transmitted by a second transmission point of the set of transmission points using at least a second subset of the set of component carriers during the time period. The operations of 1615 may be performed according to the methods described herein. In some examples, aspects of the operations of 1615 may be performed by a UE HARQ feedback manager as described with reference to FIGS. 7 through 9.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a network entity, comprising:
establishing a plurality of connections using a plurality of component carriers;
generating a first one or more downlink control information messages in accordance with a first control resource set (CORESET) group for transmission using at least a first subset of the plurality of component carriers;
generating a second one or more downlink control information messages in accordance with a second CORESET group for transmission using at least a second of the plurality of component carriers, wherein the first one or more downlink control information messages and the second one or more downlink control information messages are scheduled to be transmitted during a control channel monitoring occasion; and
ordering the first one or more downlink control information messages and the second one or more downlink control information messages based at least in part on an associated component carrier and an associated CORESET group of each downlink control information message if a joint feedback mode is configured for the first one or more downlink control information messages and the second one or more downlink control information messages.

2. The method of claim 1, further comprising:
transmitting the first one or more downlink control information messages and the second one or more downlink control information messages during the control channel monitoring occasion in accordance with the ordering.

3. The method of claim 1, further comprising:
sequentially assigning a first set of indices to the first one or more downlink control information messages and the second one or more downlink control information messages that are within a first component carrier; and
sequentially assigning a second set of indices to the first one or more downlink control information messages and the second one or more downlink control information messages that are within a second component carrier after sequentially assigning the first set of indices, wherein a last index of the first set is in sequence with a first index of the second set of indices, and wherein the ordering is based at least in part on the first set of indices and the second set of indices.

4. The method of claim 3, further comprising:
assigning a first index to a first downlink control information message of the first one or more downlink control information messages that is scheduled to be transmitted using the first component carrier;
assigning a second index to a first downlink control information message of the second one or more downlink control information messages that is scheduled to be transmitted using the first component carrier;

assigning a third index to a second downlink control information message of the first one or more downlink control information messages that is scheduled to be transmitted using the second component carrier; and assigning a fourth index to a second downlink control information message of the second one or more downlink control information messages that is scheduled to be transmitted using the second component carrier, wherein the ordering is based at least in part on the first index, the second index, the third index, and the fourth index.

5. The method of claim 1, further comprising:

assigning a first index to a first subset of a plurality of CORESET groups and a second index to a second subset of the plurality of CORESET groups;

transmitting the first one or more downlink control information messages over the first subset of the plurality of CORESET groups associated with the first index; and transmitting the second one or more downlink control information messages over the second subset of the plurality of CORESET groups.

6. The method of claim 1, further comprising:

generating a third one or more downlink control information messages in accordance with the first CORESET group for transmission using at least a third subset of the plurality of component carriers;

generating a fourth one or more downlink control information messages in accordance with the second CORESET group for transmission using a least a fourth subset of the plurality of component carriers;

jointly assigning indices to the first one or more downlink control information messages, the second one or more downlink control information messages, the third one or more downlink control information messages, and the fourth one or more downlink control information messages; and transmitting the first one or more downlink control information messages and the second one or more downlink control information messages during the control channel monitoring occasion; and transmitting the third one or more downlink control information messages and the fourth one or more downlink control information messages during the second control channel monitoring occasion.

7. The method of claim 1, further comprising:

computing a summation of a first quantity of the first one or more downlink control information messages and a second quantity of the second one or more downlink control information messages; and programming, in each of the first one or more downlink control information messages and the second one or more downlink control information messages, a field that indicates the summation, wherein the field comprises two bits.

8. The method of claim 1, further comprising:

programming, in each of the first one or more downlink control information messages and the second one or more downlink control information messages, a field that indicates an order of a downlink control information message within the control channel monitoring occasion, wherein the field comprises two bits.

9. A method for wireless communications at a user equipment (UE), comprising:

establishing a plurality of connections utilizing a plurality of component carriers;

monitoring a first one or more downlink control information messages in accordance with a first control resource set (CORESET) group received using at least a first subset of the plurality of component carriers;

monitoring a second one or more downlink control information messages in accordance with a second CORESET group using at least a second subset of the plurality of component carriers, wherein the first one or more downlink control information messages and the second one or more downlink control information messages are received in a control channel monitoring occasion; and ordering the first one or more downlink control information messages and the second one or more downlink control information messages based at least in part on an associated component carrier and an associated CORESET group of each downlink control information message if a joint feedback mode is configured for the first one or more downlink control information messages and the second one or more downlink control information messages.

10. The method of claim 9, further comprising:

determining that a downlink control information message of the first one or more downlink control information messages or the second one or more downlink control information messages was missed based at least in part on the ordering.

11. The method of claim 9, wherein the ordering comprises:

ordering the first one or more downlink control information messages and the second one or more downlink control information messages across associated CORESET groups for a given component carrier and then across the plurality of component carriers.

12. The method of claim 11, further comprising:

arranging the first one or more downlink control information messages and the second one or more downlink control information messages in a sequential order; and constructing a hybrid automatic repeat request feedback message based at least in part on the arranging.

13. The method of claim 11, further comprising:

determining that at least one of the first one or more downlink control information messages were missed based at least in part on ordering the first one or more downlink control information messages and the second one or more downlink control information messages.

14. An apparatus for wireless communications at a network entity, comprising:

a processor, memory coupled with the processor; and instructions stored in the memory and executable by the processor to cause the apparatus to:

establish a plurality of connections using a plurality of component carriers;

generate a first one or more downlink control information messages in accordance with a first control resource set (CORESET) group for transmission using at least a first subset of the plurality of component carriers;

generate a second one or more downlink control information messages in accordance with a second CORESET group for transmission using at least a first second of the one or more component carriers, wherein the first one or more downlink control information messages and the second one or more downlink control information messages are scheduled to be transmitted during a control channel monitoring occasion; and ordering the first one or more downlink control information messages and the second one or more downlink control information messages based at least in part on an associated component carrier and an associated CORESET group of each downlink control information message if a joint feedback mode is configured for the first one or more downlink control information messages and the second one or more downlink control information messages.

15. The apparatus of claim 14, wherein the instructions are further executable by the processor to cause the apparatus to:
transmit the first one or more downlink control information messages and the second one or more downlink control information messages during the control channel monitoring occasion in accordance with the ordering.

16. The apparatus of claim 14, wherein the instructions are further executable by the processor to cause the apparatus to:
sequentially assign a first set of indices to the first one or more downlink control information messages and the second one or more downlink control information messages that are within a first component carrier; and
sequentially assign a second set of indices to the first one or more downlink control information messages and the second one or more downlink control information messages that are scheduled on a second component carrier after sequentially assigning the first set of indices, wherein a last index of the first set of indices corresponds to a first index of the second set of indices, and wherein the ordering is based at least in part on the first set of indices and the second set of indices.

17. The apparatus of claim 16, wherein the instructions are further executable by the processor to cause the apparatus to:
assign a first index to a first downlink control information message of the first one or more downlink control information messages that are scheduled on the first component carrier;
assign a second index to a first downlink control information message of the second one or more downlink control information messages that are scheduled on the first component carrier;
assign a third index to a second downlink control information message of the first one or more downlink control information messages that are scheduled on the second component carrier; and
assign a fourth index to a second downlink control information message of the second one or more downlink control information messages that are scheduled on the second component carrier, wherein the ordering is based at least in part on the first index, the second index, the third index, and the fourth index.

18. The apparatus of claim 14, wherein the instructions are further executable by the processor to cause the apparatus to:
assign a first index to a first subset of a plurality of CORESET groups and a second index to a second subset of the plurality of CORESET groups;
transmit the first one or more downlink control information messages via the first subset of the plurality of CORESET groups associated with the first index; and
transmit the second one or more downlink control information messages via the second subset of the plurality of CORESET groups associated with the second index.

19. The apparatus of claim 14, wherein the instructions are further executable by the processor to cause the apparatus to:
generate a third one or more downlink control information messages associated with the first CORESET group for transmission using at least a third subset of the plurality of component carriers;
generate a fourth one or more downlink control information messages associated with the second CORESET group for transmission using a least a fourth subset of the plurality of component carriers;
jointly assign indices to the first one or more downlink control information messages, the second one or more downlink control information messages, the third one or more downlink control information messages, and the fourth one or more downlink control information messages;
transmit the first one or more downlink control information messages and the second one or more downlink control information messages during the control channel monitoring occasion; and
transmit the third one or more downlink control information messages and the fourth one or more downlink control information messages during a second control channel monitoring occasion.

20. The apparatus of claim 14, wherein the instructions are further executable by the processor to cause the apparatus to:
compute a summation of a first quantity of the first one or more downlink control information messages and a second quantity of the second one or more downlink control information messages; and
program, in each of the first one or more downlink control information messages and the second one or more downlink control information messages, a field that indicates the summation, wherein the field comprises two bits.

21. The apparatus of claim 14, wherein the instructions are further executable by the processor to cause the apparatus to:
program, in each of the first one or more downlink control information messages and the second one or more downlink control information messages, a field that indicates an order of a given downlink control information message within the control channel monitoring occasion, wherein the field comprises two bits.

22. An apparatus for wireless communications at a user equipment (UE), comprising:
a processor,
memory coupled with the processor; and
instructions stored in the memory and executable by the processor to cause the apparatus to:
establish a plurality of connections using a plurality of component carriers;
monitor for a first one or more downlink control information messages associated with a first control resource set (CORESET) group using at least a first subset of the plurality of component carriers;
monitor for a second one or more downlink control information messages associated with a second CORESET group using at least a second subset of the plurality of component carriers, wherein the first one or more downlink control information messages and the second one or more downlink control information messages are scheduled in a control channel monitoring occasion; and ordering the first one or more downlink control information messages and the second one or more downlink control information messages based at least in part on an associated component carrier and an associated CORESET group of each downlink control information message if a joint feedback mode is configured for the first one or more downlink control information messages and the second one or more downlink control information messages.

23. The apparatus of claim 22, wherein the instructions are further executable by the processor to cause the apparatus to:
determine that a downlink control information message of the first one or more downlink control information messages or the second one or more downlink control information messages was missed based at least in part on the ordering.

24. The apparatus of claim 22, wherein, to order the first one or more downlink control information messages and the second one or more downlink control information messages, the instructions are executable by the processor to cause the apparatus to:
order the first one or more downlink control information messages and the second one or more downlink control information messages across associated CORESET groups for a component carrier and then across the plurality of component carriers.

25. The apparatus of claim 24, wherein the instructions are further executable by the processor to cause the apparatus to:
arrange the first one or more downlink control information messages and the second one or more downlink control information messages in a sequential order; and
construct a hybrid automatic repeat request feedback message based at least in part on the arranging.

26. The apparatus of claim 24, wherein the instructions are further executable by the processor to cause the apparatus to:
determine that at least one of the first one or more downlink control information messages was missed based at least in part on ordering the first one or more downlink control information messages and the second one or more downlink control information messages.

\* \* \* \* \*